(12) United States Patent
Wang et al.

(10) Patent No.: US 12,062,801 B2
(45) Date of Patent: Aug. 13, 2024

(54) FRAME BODY, BATTERY PACK, AND DEVICE

(71) Applicant: Contemporary Amperex Technology Co., Limited, Ningde (CN)

(72) Inventors: Wenjie Wang, Ningde (CN); Yannan Chu, Ningde (CN); Youxin Wu, Ningde (CN); Qiwang Zhou, Ningde (CN); Shuai Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 359 days.

(21) Appl. No.: 17/714,181

(22) Filed: Apr. 6, 2022

(65) Prior Publication Data

US 2022/0231368 A1    Jul. 21, 2022

Related U.S. Application Data

(63) Continuation of application No. PCT/CN2021/082082, filed on Mar. 22, 2021.

(30) Foreign Application Priority Data

Mar. 27, 2020  (CN) .......................... 202020419984.8
Dec. 25, 2020  (CN) .......................... 202011568483.7

(51) Int. Cl.
   *H01M 50/209*   (2021.01)
   *B60K 1/04*     (2019.01)
   (Continued)

(52) U.S. Cl.
   CPC ............. *H01M 50/209* (2021.01); *B60K 1/04* (2013.01); *H01M 50/249* (2021.01); *H01M 50/262* (2021.01); *B60K 2001/0438* (2013.01)

(58) Field of Classification Search
   None
   See application file for complete search history.

(56) References Cited

FOREIGN PATENT DOCUMENTS

| CN | 106711368 A | 5/2017 |
|---|---|---|
| CN | 107331812 A | 11/2017 |

(Continued)

OTHER PUBLICATIONS

The Communication pursuant to Article 94(3) EPC for Europe an Application No. 21774579.3, dated Dec. 5, 2022, 5 pages.

(Continued)

*Primary Examiner* — Wyatt P McConnell
(74) *Attorney, Agent, or Firm* — East IP P.C.

(57) ABSTRACT

The embodiments of the present application provide a frame body, a battery pack, and a device. The frame body used for a battery pack includes a first bracket comprising a first mold chamber; a second bracket connected end to end with the first bracket to form a receiving cavity, the second bracket comprising a second mold chamber; and a block comprising a first reinforcement portion and a second reinforcement portion, wherein the first reinforcement portion received in the first mold chamber and the second reinforcement portion received in the second mold chamber, and the block is adapted to connect the first bracket with the second bracket. The frame body is provided with a block at a connecting portion of the first bracket and the second bracket, thereby improving a connection strength and rigidity of the frame body and the overall bearing capacity of the lower housing including the frame body.

17 Claims, 10 Drawing Sheets

(51) Int. Cl.
   *H01M 50/249* (2021.01)
   *H01M 50/262* (2021.01)

(56) References Cited

FOREIGN PATENT DOCUMENTS

| CN | 108461685 | * | 8/2018 |
| CN | 108461685 A | | 8/2018 |
| CN | 207993939 U | | 10/2018 |
| CN | 109768199 A | | 5/2019 |
| CN | 209176495 U | | 7/2019 |
| CN | 209282269 U | | 8/2019 |
| CN | 209336472 U | | 9/2019 |
| CN | 211320183 U | | 8/2020 |
| CN | 211605235 U | | 9/2020 |
| DE | 102017117093 A1 | | 1/2019 |
| DE | 102017223474 A1 | | 6/2019 |
| JP | 2008100626 A | | 5/2008 |
| JP | 2013133044 A | | 7/2013 |
| JP | 2015097170 A | | 5/2015 |
| JP | 2016097851 A | | 5/2016 |
| WO | 2019169080 A1 | | 9/2019 |
| WO | 2020000090 A1 | | 1/2020 |

OTHER PUBLICATIONS

The extended European search report for European Application No. 21774579.3, dated Jul. 28, 2022, 8 pages.
The First Office Action for Chinese Application No. 202011568483.7, dated Nov. 18, 2022, 21 pages.
The International search report for PCT Application No. PCT/CN2021/082082, dated Jun. 23, 2021, 12 pages.
The First Office Action for JP Application No. 2022-541790, dated Sep. 4, 2023, 12 pages.

* cited by examiner

FRAME BODY, BATTERY PACK, AND DEVICE

CROSS-REFERENCE TO RELATED APPLICATION

This application is a continuation of International Application No. PCT/CN2021/082082, filed on Mar. 22, 2021, which claims priority to Chinese Patent Application No. 202020419984.8, filed on Mar. 27, 2020, and Chinese Patent Application No. 202011568483.7, filed on Dec. 25, 2020, all of which are incorporated herein by reference in their entireties.

FIELD

The disclosure relates to a technical field of battery, and in particular to a frame body, a battery pack, and a device.

BACKGROUND

A lower housing of a battery package is a carrier of all components, and its structural strength and sealing performance are particularly important. At present, a lower housing generally includes a bottom plate, a side frame, a fastener, and other parts, and each part is manufactured by lap joint or tailor welding. However, stress concentration is easily formed at a welding seam of the side frame to cause a risk of failure.

SUMMARY

The purpose of the present application is to provide a frame body, a battery pack, and a device, and the frame body has a high connection strength and rigidity.

In a first aspect, an embodiment of the present application proposes a frame body including a first bracket including a first mold chamber; a second bracket connected end-to-end with the first bracket to form a receiving cavity, the second bracket including a second mold chamber; and a block including a first reinforcement portion and a second reinforcement portion, wherein the first reinforcement portion is received in the first mold chamber, the second reinforcement portion is received in the second mold chamber, and the block is adapted to connect the first bracket with the second bracket.

According to an aspect of an embodiment of the present application, the first bracket includes a first end close to the second bracket, and the first reinforcement portion is received in the first mold chamber of the first end; and the second bracket includes a second end close to the first bracket, and the second reinforcement portion is received in the second mold chamber of the second end.

According to an aspect of an embodiment of the present application, the first bracket includes a first outer top wall, the second bracket includes a second outer top wall, the first outer top wall is welded to the second outer top wall, and an end portion close to an inner portion of the frame body of a welding line of the first outer top wall and the second outer top wall is defined as a first line segment; and the first reinforcement portion is received in the first mold chamber of the first bracket, fixed to the first bracket, and the second reinforcement portion is received in the second mold chamber of the second bracket, fixed to the second bracket, wherein an outer surface of the block includes a first region, and an orthographic projection of the first line segment on a plane where the first region is located falls within the first region.

According to an aspect of an embodiment of the present application, an intersecting line of the first outer top wall and the second outer top wall further includes a second line segment, while the first line segment intersects non-collinearly with the second line segment.

According to an aspect of an embodiment of the present application, the first bracket includes two side walls arranged along a first direction, the first outer top wall is an outer wall for connecting the two side walls of the first bracket, the first bracket further includes a first hollow cavity, and the first hollow cavity and the first mold chamber are arranged along the first direction; and the second bracket includes two side walls arranged along a second direction, the second outer top wall is an outer wall for connecting the two side walls of the second bracket, the second bracket further includes a second hollow cavity, and the second hollow cavity and the second mold chamber are arranged along the second direction.

According to an aspect of an embodiment of the present application, the frame body further includes a first connecting member for fixing the first reinforcement portion to the first bracket; and a second connecting member for fixing the second reinforcement portion to the second bracket.

According to an aspect of an embodiment of the present application, the first connecting member includes a head and a connecting portion, the first mold chamber and the first hollow cavity each is arranged in a column, the first mold chamber is disposed close to an outer side of the frame body, the first hollow cavity is disposed close to an internal portion of the frame body, and the first hollow cavity is adapted to receive the head of the first connecting member; and the second connecting member includes a head and a connecting portion, the second mold chamber and the second hollow cavity each is arranged in a column, the second mold chamber is disposed close to the outer side of the frame body, the second hollow cavity is disposed close to the internal portion of the frame body, and the second hollow cavity is adapted to receive the head of the second connecting member.

According to an aspect of an embodiment of the present application, the block includes a raised portion protruding towards the internal portion of the frame body from an intersecting portion of the first reinforcement portion and the second reinforcement portion, and the outer surface of the raised portion includes the first region.

According to an aspect of an embodiment of the present application, a first internal portion wall in the two side walls of the first bracket facing the internal portion of the frame body is provided with a first notch region, a second internal portion wall of the two side walls of the second bracket facing the internal portion of the frame body is provided with a second notch region, and the first notch region and the second notch region are both adapted to avoid the raised portion.

According to an aspect of an embodiment of the present application, the first reinforcement portion includes a plurality of first reinforcement blocks, the first bracket includes a plurality of first mold chambers, and each of said plurality of first reinforcement blocks is received in a first mold chamber corresponding to said plurality of first mold chambers; and the second reinforcement portion includes a plurality of second reinforcement blocks, the second bracket includes a plurality of second mold chambers, and each of said plurality of second reinforcement blocks is received in a second mold chamber corresponding to said plurality of second mold chambers.

According to an aspect of an embodiment of the present application, the plurality of first reinforcement blocks are arranged along a third direction, the plurality of second reinforcement blocks are arranged along a third direction, and the third direction is a height direction of the first bracket.

According to an aspect of an embodiment of the present application, the first connecting member is adapted to fix at least one first reinforcement block of said plurality of first reinforcement blocks to the first bracket; and the second connecting member is adapted to fix at least one second reinforcement block of said plurality of second reinforcement blocks to the second bracket.

According to an aspect of an embodiment of the present application, the raised portion protrudes towards the internal portion of the frame body from an intersecting portion of the at least one first reinforcement block and the at least one second reinforcement block.

According to an aspect of an embodiment of the present application, a plurality of first connecting members are disposed on the at least one first reinforcement block; and a plurality of second connecting members are disposed on the at least one second reinforcement block.

According to an aspect of an embodiment of the present application, a plurality of first connecting members are arranged along a second direction, a distance between a position of said plurality of first connecting members and a first end of the corresponding first reinforcement block accounts a length of one-sixth to one-half of the corresponding first reinforcement block in the second direction, and the first end is an end of the corresponding first reinforcement block away from the second wall; and a plurality of second connecting members are arranged along the first direction, a distance between a position of said second connecting members and a second end of the corresponding second reinforcement block accounts a length of one-sixth to one-half of the corresponding second reinforcement block in the first direction, and the second end is an end of the corresponding second reinforcement block away from the first wall.

In another aspect, an embodiment of the present application further proposes a battery pack including: a plurality of battery cells; an upper housing; a bottom plate; and the frame body as described above, wherein the bottom plate and the frame body form a lower housing, and the lower housing is covered and closed by the upper housing forming an enclosed space for receiving a plurality of battery cells.

In another aspect, an embodiment of the present application further proposes a device using a battery pack as a power source, including: the battery pack as described above, the battery pack is adapted to provide electrical energy.

In another aspect, an embodiment of the present application further proposes a method for producing a frame body of a battery, including: providing a plurality of first brackets and a plurality of second brackets to form a receiving cavity of the frame body, t first mold chamber is provided inside the first bracket, a second mold chamber is provided inside the second bracket, the first bracket includes a first outer top wall, the second bracket includes a second outer top wall, the first outer top wall being welded to the second outer top wall, and an end portion of a welding line between the first outer top wall and the second outer top wall close to an internal portion of the frame body is defined as a first line segment; and providing a block, the block including a first reinforcement portion and a second reinforcement portion being connected with each other, the first reinforcement portion being received in the first mold chamber of the first bracket and fixed to the first bracket, and the second reinforcement portion being received in the second mold chamber of the second bracket and fixed to the second bracket, wherein an outer surface of the block includes a first region, and an orthographic projection of the first line segment on a plane where the first region is located falls within the first region.

In another aspect, an embodiment of the present application further proposes a device for producing a frame body of a battery, and the device includes a providing module, the providing module being adapted to provide a plurality of first brackets and a plurality of second brackets to form a receiving space for the frame body, a first mold chamber is provided inside a first bracket, a second mold chamber is provided inside a second bracket, the first bracket including a first outer top wall, the second bracket including a second outer top wall, the first outer top wall being welded to the second outer top wall, and an end portion of a welding line between the first outer top wall and the second outer top wall close to an internal portion of the frame body being defined as a first line segment; and a block, the block including a first reinforcement portion and a second reinforcement portion being connected with each other, the first reinforcement portion being received in the first mold chamber of the first bracket and fixed to the first bracket, and the second reinforcement portion being received in the second mold chamber of the second bracket and fixed to the second bracket, wherein an outer surface of the block includes a first region, and an orthographic projection of the first line segment on a plane where the first region is located falls within the first region.

BRIEF DESCRIPTION OF THE DRAWINGS

In order to more clearly describe the technical solutions of the embodiments of the present application, drawings that need to be used in the embodiments of the present application will be briefly introduced as below, and it is obvious for those skilled in the art that the drawings described below are only some embodiments of the present application and other drawings can be obtained based on the drawings without creative work.

DETAILED DESCRIPTION

Figure 1:
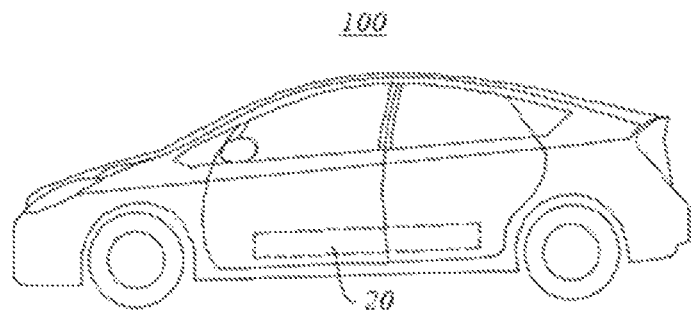
FIG. 1 is a schematic view of a structure of a vehicle disclosed by an embodiment of the present application.

The embodiments of the present application are described in further detail below with reference to the drawings and embodiments. The detailed description and drawings of the following embodiments are used to exemplarily illustrate the principle of the present application, but cannot be used to limit the scope of the present application, that is, the present application is not limited to the described embodiments.

In the description of the present application, it should be noted that, unless otherwise stated, "multiple" means more than two; the orientation or position relationship indicated by the terms "upper", "lower", "left", "right", "inner", "outside", and the like is only for the convenience of describing the present application and simplifying the description, and does not indicate or imply that the device or element referred to must have a specific orientation, or must be configured and operated in a specific orientation, and thus these terms should not be understood to limit the present application. Moreover, the terms "first", "second", "third", and the like are used for descriptive purposes only and should not be understood to indicate or imply relative importance. "Perpendicular" is not perpendicular in strict sense, but within a tolerance range. "Parallel" is not parallel in strict sense, but within a tolerance range.

The orientation words present in the following description refer to the directions shown in the drawings, and do not limit the specific structure of the present application. In the description of the present application, it should also be noted that, unless otherwise specified and limited, the terms "install", "connected with", and "connect" should be understood in a broad sense, for example, they can be fixed connection, removable connection, or integral connection; and can be direct connection or indirect connection through an intermediate medium. For those skilled in the art, the specific meaning of the terms in the present application described above can be understood according to specific conditions.

For brevity, in different embodiments, detailed description of the same component is omitted. It should be understood that the thickness, length, width, and other dimension of various components as well as the overall thickness, length, width, and other dimension of the integrated device in the embodiments of the present application shown in the drawings are only described exemplarily and should not constitute any limitation to the present application.

"Multiple" present in the present application refers to two or more (including two), "multiple groups of" similarly refers to two or more groups (including two groups), and "multiple pieces" refers to two or more pieces (including two pieces).

In the present application, the battery cell may include a lithium ion secondary battery, a lithium ion primary battery, a lithium sulfur battery, a sodium lithium ion battery, a sodium ion battery, a magnesium ion battery, or the like, which is not limited in the embodiments of the present application. The battery cell may be in a cylindrical, flat, rectangular, or other shape, which is also not limited in the embodiments of the present application. According to the way of encapsulating, the battery cell is generally divided into three types: a cylindrical battery cell, a cuboid battery cell, and a soft-packed battery cell, which is also not limited in the embodiments of the present application.

The battery pack mentioned in the embodiments of the present application refers to a single physical module which includes one or more battery cells to provide high voltage and capacity. For example, the battery pack mentioned in the present application may include a battery module or a battery package. The battery pack generally includes a housing for encapsulating one or more battery cells. The housing can avoid liquid or other foreign objects from affecting the charging or discharging of the battery cell.

The battery cell includes an electrode assembly and electrolyte, and the electrode assembly is composed of a positive electrode plate, a negative electrode plate, and a separator. The battery cell mainly operations by means of the movement of a metal ion between the positive electrode plate and the negative electrode plate. The positive electrode plate includes a positive electrode current collector and a positive electrode active material layer, the positive electrode active material layer is coated on a surface of the positive electrode current collector, and a portion of the current collector which is not coated with the positive electrode active material layer protrudes beyond a portion of the current collector which is coated with the positive electrode active material layer and is used as a positive electrode tab. Taking a lithium ion battery as an example, the material of the positive electrode current collector can be aluminum, and the positive electrode active material can be lithium cobaltate, lithium iron phosphate, ternary lithium, lithium manganate, or the like. The negative electrode plate includes a negative electrode current collector and a negative electrode active material layer, the negative electrode active material layer is coated on a surface of the negative electrode current collector, and a portion of the current collector which is not coated with the negative electrode active material layer protrudes beyond a portion of the current collector which is coated with the negative electrode active material layer and is used as a negative electrode tab. The material of the negative electrode current collector can be copper, and the negative electrode active material can be carbon, silicon, or the like. In order to ensure that a large current is passed without fusing, the number of positive electrode tabs is multiple and the positive electrode tabs are stacked together, and the number of negative electrode tabs is multiple and the negative electrode tabs are stacked together. The material of the separator may be PP, PE, or the like. Moreover, the electrode assembly may be a winding structure or a stacked plate structure, and the embodiments of the present application are not limited thereto.

The housing of the battery pack in the embodiments of the present application is used to receive a plurality of battery cells, a bus component, and other components of the battery. In some embodiments, a structure for fixing the battery cells may also be disposed in the housing. The shape of the housing can be determined according to the received plurality of battery cells. In some embodiments, the housing may be cuboid with six walls.

The bus component mentioned in the present application is used to realize the electrical connection, for example parallel connection, series connection, or any combination thereof, among a plurality of battery cells. The bus component can realize the electrical connection between the battery cells by connecting electrode terminals of the battery cells. In some embodiments, the bus component may be fixed to the electrode terminal of the battery cell by welding.

It should be understood that the individual components in the housing of the battery pack described above should not be understood as a limitation to the embodiments of the present application, that is to say, the housing for the battery pack of the embodiments of the present application may include or not include the components described above.

The technical solutions described by the embodiments of the present application are applied to various devices that use battery packs as power sources. The device can be, for example, but not limited to a mobile phone, a portable device, a notebook computer, a motor pedal, an electric toy, a power tool, a vehicle, a ship, a spacecraft, or the like, and for example, the spacecraft includes an airplane, a rocket, a space shuttle, a spaceship, or the like.

It should be understood that the technical solutions described in the embodiments of the present application may not only be applied to the devices described above, but also be applied to all devices that use the battery packs, but for brief description, the description is made by taking a vehicle as an example in the following embodiments.

FIG. 1 is a schematic view of a structure of a vehicle provided by an embodiment of the present disclosure. With reference to FIG. 1, the vehicle 100 may be a fuel vehicle, a gas vehicle, a new energy vehicle, or the like, and the new energy vehicle may be a pure electric vehicle, a hybrid vehicle, a range-extended vehicle, or the like. A motor, a controller, and a battery pack 20 may be disposed within the vehicle 100, and the controller is used to control the battery pack 20 to supply power to the motor. For example, the battery pack 20 may be disposed on the bottom, in the front, or in the rear of the vehicle 100. The battery pack 20 can be used to supply power to the vehicle 100, for example, can be used as an operating power source of the vehicle 100, and the battery pack 20 can be used for a circuit system of the vehicle 100, for example, can be used for the requirement on the operation electricity when the vehicle 100 starts, navigates, and runs. In another embodiment of the present application, the battery pack 20 can be used not only as the operating power source of the vehicle 100, but also as a driving power source of the vehicle 100, and alternatively or partially replaces fuel or natural gas to provide driving power for the vehicle 100.

Figure 2:
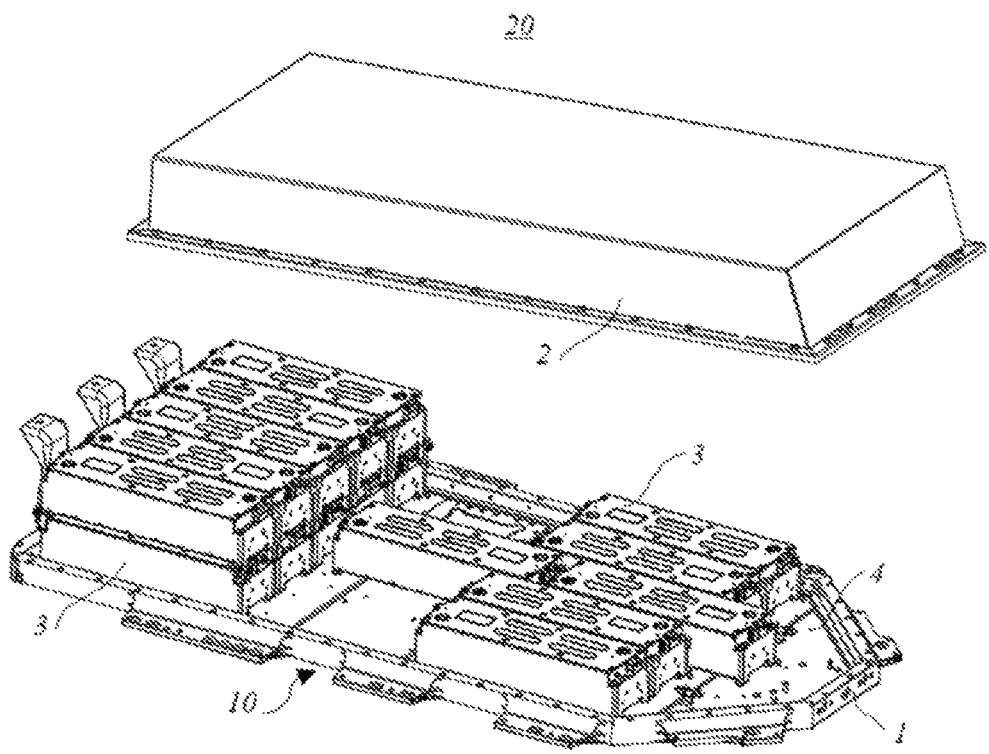
FIG. 2 is a schematic view of an exploded structure of a battery pack disclosed by an embodiment of the present application.

In order to satisfy different requirements on the electricity usage, the battery pack 20 may include a plurality of battery cells. For example, FIG. 2 is a schematic view of an exploded structure of a battery pack according to an embodiment of the present application. The battery pack 20 may include a plurality of battery cells 3. According to different requirements on the electricity, the number of battery cells 3 can be set to any value. The plurality of battery cells 3 can be connected in series, in parallel, or any combination thereof to realize large capacity or power. Since the number of battery cells 3 included in each battery pack 20 may be large, the battery cells 3 may be disposed in groups in order to facilitate installation, and each group of battery cells 3 constitutes a battery module. The number of battery cells 3 included in the battery module is not limited and can be set according to requirements. The battery pack may include a plurality of battery modules, and these battery modules may be connected in series, in parallel, or any combination thereof.

Optionally, the battery pack 20 may further include other structures. For example, the battery pack 20 may further include a bus component, which is used to realize an electrical connection, for example, a parallel connection, a series connection, or any combination thereof, among the plurality of battery cells 3. Specifically, the bus component can realize the electrical connection between the battery cells 3 by connecting electrode terminals of the battery cells 3. Further, the bus component may be fixed to the electrode terminals of the battery cells 3 by welding. The electric energy of the plurality of battery cells 3 can be further drawn out through a housing by a conductive mechanism. Optionally, the conductive mechanism may alternatively belong to the bus component.

The battery pack 20 may further include a housing (or a cover), an internal portion of the housing is a hollow structure, and a plurality of battery cells 3 are received in the housing. As shown in FIG. 2, the housing may include two parts, which are referred to herein as a first component and a second component (or may also be referred to as an upper housing 2 and a lower housing 10), and the upper housing 2 and the lower housing 10 are buckled together. The shapes of the upper housing 2 and the lower housing 10 may be determined according to the combined shape of said plurality of battery cells 3, and at least one component of the upper housing 2 and the lower housing 10 includes an opening. Optionally, both the upper housing 2 and the lower housing 10 included in the housing in an embodiment of the present application may each be hollow cuboid and only one of the surfaces is an opening face, the opening of the upper housing 2 and the opening of the lower housing 10 are disposed opposite to each other, and the upper housing 2 and the lower housing 10 are buckled with each other to form the housing with an enclosed chamber. Said plurality of battery cells 3 are connected in parallel, in series, or any combination thereof, then being placed in the housing formed by the upper housing 2 and the lower housing 10 buckling together.

In an embodiment, the battery pack 20 includes an upper housing 2, a lower housing 10, and a plurality of battery cells 3. As shown in FIG. 2, the lower housing 10 includes a bottom plate 4 and a frame body 1, the upper housing 2 covers and encloses the lower housing 10 to form an enclosed space for receiving said plurality of battery cells 3 arranged side by side in the enclosed space. For convenience of description, the description is made by taking the housing shown in FIG. 2 as an example in the embodiments of the present application, but the embodiments of the present application are not limited thereto.

Figure 3:
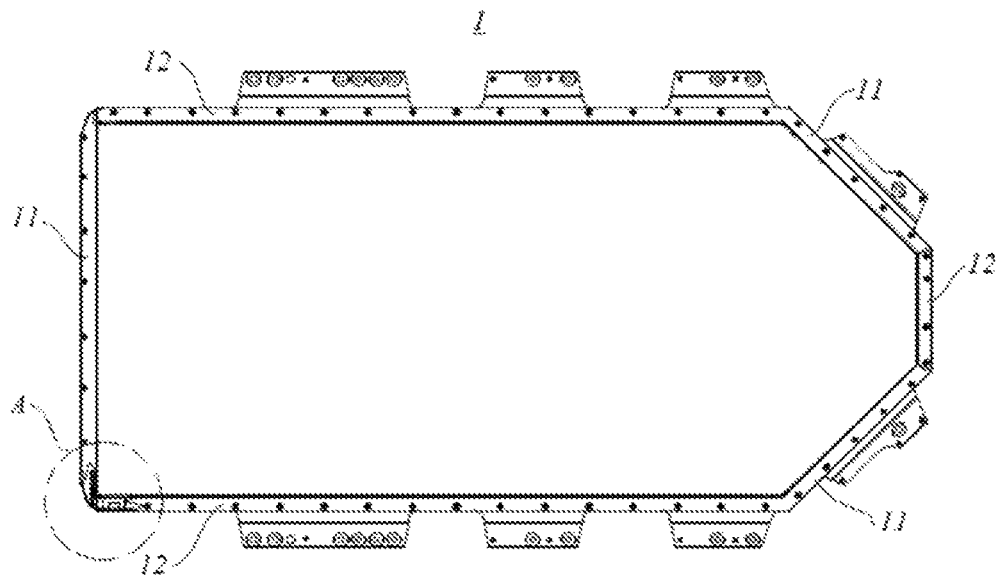
FIG. 3 is a schematic view of a structure of a lower housing disclosed by an embodiment of the present application.

FIG. 3 shows a schematic view of a structure of the lower housing provided by an embodiment of the present application, and as shown in FIG. 3, the structural strength and sealing performance of the lower housing 10 of the housing is particularly important since the lower housing 10 of the housing is a carrier of each internal components. At present, the bottom plate 4 of the lower housing 10 with the frame body 1 and other parts are manufactured by lap joint and tailor welding. However, stress concentration is easily formed at welding seams between each frame bodies 1, and the strength of the welding seams is low, thereby causing a risk of failure and not satisfying the requirement on the strength of the housing. If the strength of the housing is increased by adding a reinforcement supporter within the lower housing 10, it is necessary for the reinforcement supporter to occupy the internal space of the lower housing 10, thereby causing low utilization of the internal space of the lower housing 10 and affecting the installation of the battery cell 3.

Therefore, an embodiment of the present application provides a frame body 1, and a reinforcement structure is disposed within the frame body 1 to solve the problems described above.

Figure 4:
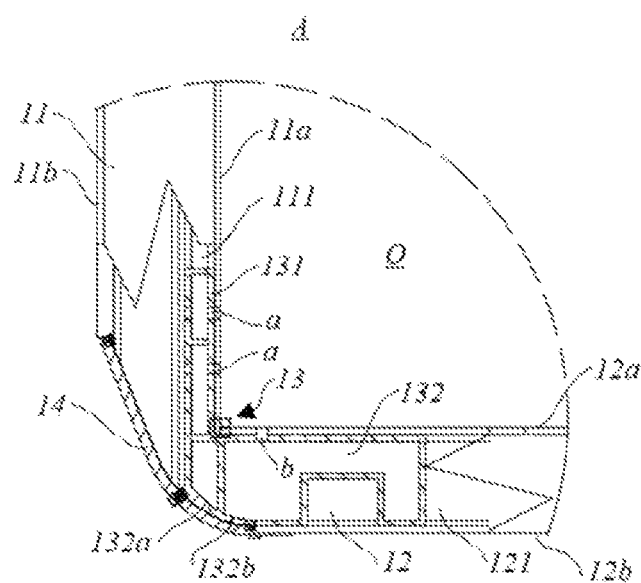
FIG. 4 is a schematic view of an enlarged structure of a region A in FIG. 3.
Figure 5:
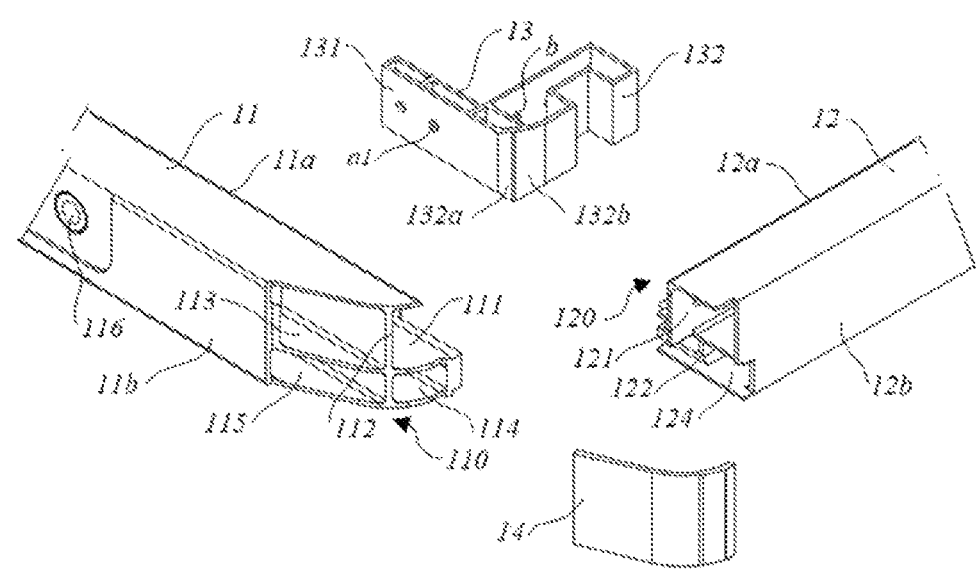
FIG. 5 is a schematic view of a partial exploded structure of a frame body provided by an embodiment of the present application.

With reference to FIGS. 3 to 5, the frame body 1 provided by an embodiment of the present application includes a first bracket 11, a second bracket 12, and a block 13.

The first bracket 11 possesses a first mold chamber 111. Optionally, the first bracket 11 is an extruded profile, which can improve the structural strength of the first bracket 11 while reducing the weight of the first bracket 11 at the same time.

The second bracket 12 possesses a second mold chamber 121. Optionally, the second bracket 12 is an extruded profile, which can improve the structural strength of the second bracket 12 while reducing the weight of the second bracket 12 at the same time. A plurality of second brackets 12 and a plurality of first brackets 11 are connected end to end in sequence to form a receiving cavity O.

The block 13 includes a first reinforcement portion 131 and a second reinforcement portion 132, the first reinforcement portion 131 is received in the first mold chamber 111, the second reinforcement portion 132 is received in the second mold chamber 121, and the block 13 is used to connect the first bracket 11 with the second bracket 12.

Since the battery pack 20 is subjected to vibration and impact during operations, stress is relatively concentrated at the connecting portion between the first bracket 11 and the second bracket 12 of the frame body 1, thereby causing a risk of failure. The block 13 is integrally connected the first bracket 11 with the second bracket 12 and thus makes the block 13 the main object for bearing loads, thereby reducing the stress concentration at the connecting portion and improving the connection strength and rigidity of the frame body 1.

Optionally, the block 13 is a hollow double-layered structure, improving the structural strength and rigidity of the block 13. In addition, through the simulation calculation and analysis results, a side, for example, a connecting portion between two ends of the first bracket 11 located on the left and the second bracket 12 in FIG. 3, of the frame body 1 connected with the vehicle body is vulnerable to failure. Therefore, in order to save costs, in the first brackets 11 and the second brackets 12 connected end to end in sequence, the block 13 may be only disposed between the first brackets 11 and the second brackets 12 of the frame body 1 that are vulnerable to failure.

Regarding the frame body 1 provided by the embodiments of the present application, the connection strength and rigidity of the frame body 1 are improved by disposing the block 13 at the connecting portion between the first brackets 11 and the second brackets 12.

The specific structure of the frame body 1 provided by the embodiments of the present application will be further described below in conjunction with the drawings.

With reference to FIGS. 4 and 5, the first bracket 11 possesses a first end 110 close to the second bracket 12, and the first reinforcement portion 131 of the block 13 is received in the first mold chamber 111 at the first end 110. The second bracket 12 includes a second end 120 close to the first bracket 11, and the second reinforcement portion 132 of the block 13 is to received in the second mold chamber 121 at the second end 120. Since the block 13 is received in the end portion of the first bracket 11 and the end portion of the second bracket 12 respectively, the weight of the frame body 1 is reduced while improving the connection strength and rigidity of the frame body 1, thereby increasing the energy density of the lower housing 10 including the frame body 1.

Optionally, as shown in FIG. 5, the block 13 is an extruded profile, there are 3 cavities disposed within the first reinforcement portion 131, and an inwardly recessing cavity is disposed inside the second reinforcement portion 132, thereby reducing the weight of the block 13 while improving the structural strength of the block 13.

As shown in FIG. 4, the first reinforcement portion 131 of the block 13 is provided with a first positioning portion a, the second reinforcement portion 132 is provided with a second positioning portion b, the first positioning portion a is connected with the first end 110 of the first bracket 11 by a fastener, the second positioning portion b is connected with the second end 120 of the second bracket 12, and the connection can be realized specifically by fastener, welding, among others.

In some embodiments, the first positioning portion a and the second positioning portion b are both through holes, the first positioning portion a is connected with the first end 110 of the first bracket 11 through a rivet, and the second positioning portion b is connected with the second end 120 of the second bracket 12 through a rivet. As shown in FIG. 5, an inner wall of the first reinforcement portion 131 facing the receiving cavity O is provided with the first positioning portion a, that is, the through hole, and since the thickness of the first reinforcement portion 131 is comparatively small, to reserve enough receiving space for the connecting member, an avoidance hole al is disposed on an outer wall of the first reinforcement portion 131 facing away from the receiving cavity O. Since the thickness of the second reinforcement portion 132 is relatively large and thus possessing enough receiving space, the second positioning portion b, that is, a through hole, is only disposed on an inner wall of the second reinforcement portion 132 facing the receiving cavity O.

In some embodiments, the first positioning portion a and the second positioning portion b are both threaded holes. The first positioning portion a is connected with the first end 110 of the first bracket 11 through a bolt, and the second positioning portion b is connected with the second end 120 of the second bracket 12 through a bolt. In the same way, the first positioning portion a, that is, a threaded hole, is disposed on the inner wall of the first reinforcement portion 131 facing the receiving cavity O, and an avoidance hole al is disposed on the outer wall of the first reinforcement portion 131 facing away from the receiving cavity O, and the second positioning portion b, that is, a threaded hole, is disposed on the inner wall of the second reinforcement portion 132 facing the receiving cavity O.

It can be understood that any one of the first positioning portion a and the second positioning portion b may be a through hole and connected with the end portion of the corresponding first bracket 11 or second bracket 12 through a rivet; and rest one of the positioning portion a and the second positioning portion b is a threaded hole and connected with the end portion of the corresponding second bracket 12 or first bracket 11 through a bolt, so that the first bracket 11 and the second bracket 12 are connected with each other via the block 13.

Further, the side of the first reinforcement portion 131 and the second reinforcement portion 132 of the block 13 close to the receiving cavity O intersect with each other, and the side of the first reinforcement portion 131 and the second reinforcement portion 132 away from the receiving cavity O are connected through a inclined plane 132a or an arc surface 132. The inclined plane 132a may ensure a smooth and transitional connection between the side of the first reinforcement portion 131 and the second reinforcement portion 132 away from the receiving cavity O. The arc surface 132b may ensure a smooth and transitional connection between the sides of the first reinforcement portion 131 and the second reinforcement portion 132 away from the receiving cavity O.

Optionally, the side of the first reinforcement portion 131 and the second reinforcement portion 132 away from the receiving cavity O may alternatively be connected through an inclined plane 132a and an arc surface 132b. Either one of the inclined plane 132a or the arc surface 132b is connected with the side of the first reinforcement portion 131 away from the receiving cavity O, and the rest one of the inclined plane 132a and the arc surface 132b is connected with the side of the second reinforcement portion 132 away from the receiving cavity O.

As shown in FIG. 4, the inclined plane 132a is connected with the side of the first reinforcement portion 131 away from the receiving cavity O, and the arc surface 132b is connected with the side of the second reinforcement portion 132 away from the receiving cavity O. The connecting portion of the inclined plane 132a and the arc surface 132b are disposed tangentially.

Optionally, the side of the first reinforcement portion 131 and the second reinforcement portion 132 close to the receiving cavity O are disposed at a right angle, thereby ensuring no dead angle in the welding between an edge of the first bracket 11 and an edge of the second bracket 12, improving the sealing performance of the welding seam. After the first reinforcement portion 131 of the block 13 is received in the first mold chamber 111 of the first bracket 11 and the second reinforcement portion 132 is received in the second mold chamber 121 of the second bracket 12, the inclined plane 132a and/or the arc surface 132b disposed on the side of the first reinforcement portion 131 and the second reinforcement portion 132 away from the receiving cavity O can prevent corners of the frame body 1 from scratching the operator or other objects and improve the aesthetics of the frame body 1 as well.

Further, the first bracket 11 includes a first inner wall 11a close to the receiving cavity O and a first outer wall 11b away from the receiving cavity O, an installation hole 116 is disposed on the first outer wall 11b, and the frame body 1 is connected with the external apparatus through the installation hole 116. For example, the battery pack 20 is fixed onto the vehicle body by the frame body 1 via a bolt passing through the installation hole 116.

A first separation wall 112 is disposed inside the first bracket 11 and divides the internal space of the first bracket 11 into at least two cavities, wherein a wall portion forming the first mold chamber 111 includes at least a part of the first inner wall 11a.

Since the frame body 1 is connected with the external apparatus through the installation hole 116 on the first bracket 11, impurities, liquid, or the like may easily enter the installation hole 116 during vibration, shaking, or the like when the first bracket 11 bears the load. However, due to the isolation effect of the first separation wall 112, external impurities, liquid, or the like cannot enter the receiving cavity O through the first mold chamber 111 or thus affect the electrical performance of the battery pack 10. Thereby, the first separation wall 112 can not only reduce the weight of the first bracket 11 and increase the rigidity and strength of the first bracket 11, but also improve the sealing and protection performance of the frame body 1.

As shown in FIG. 5, optionally, the cross-section of the first separation wall 112 is provided in a cross shape, and the first separation wall 112 divides the internal space of the first bracket 11 into four cavities distributed in rows and columns: the first mold chamber 111, the third mold chamber 113, the fourth mold chamber 114 and the fifth mold chamber 115, wherein the first inner wall 11a corresponds to the first mold chamber 111 and the fourth mold chamber 114, and the first outer wall 11b corresponds to the third mold chamber 113 and the fifth mold chamber 115. The first reinforcement portion 131 of the block 13 is received in the first mold chamber 111. The volumes of the four cavities can be the same or different.

As described above, since the installation hole 116 bears the load, external impurities, liquid, or the like may easily enter the third mold chamber 113 or the fifth mold chamber 115 through the installation hole 116. However, due to the isolation effect of the first separation wall 112, external impurities, liquid, or the like cannot enter the receiving cavity O through the first mold chamber 111 or the fourth mold chamber 114 or thus affect the electrical performance of the battery pack 10.

Further, a second separation wall 122 is disposed within the second bracket 12 dividing the internal space of the second bracket 12 into at least two cavities, the second bracket 12 includes a second inner wall 12a close to the receiving cavity O and a second outer wall 12b away from the receiving cavity O, wherein a wall portion forming the second mold chamber 121 includes at least a part of the second inner wall 12a.

As shown in FIG. 5, optionally, the cross-section of the second separation wall 122 is provided in an L shape, the second separation wall 122 divides the internal space of the second bracket 12 into a second mold chamber 121 and a sixth mold chamber 124, the second mold chamber 121 is disposed close to the receiving cavity O, and the sixth mold chamber 124 is disposed away from the receiving cavity O. Due to the isolating effect of the second separation wall 122, external impurities, liquid, or the like cannot enter the receiving cavity O through the second mold chamber 121 or thus affect the electrical performance of the battery pack 10, and the second separation wall 122 can not only reduce the weight of the second bracket 12 and improve the rigidity and strength of the second bracket 12, but also improve the sealing and protection performance of the frame body 1.

Figure 6:
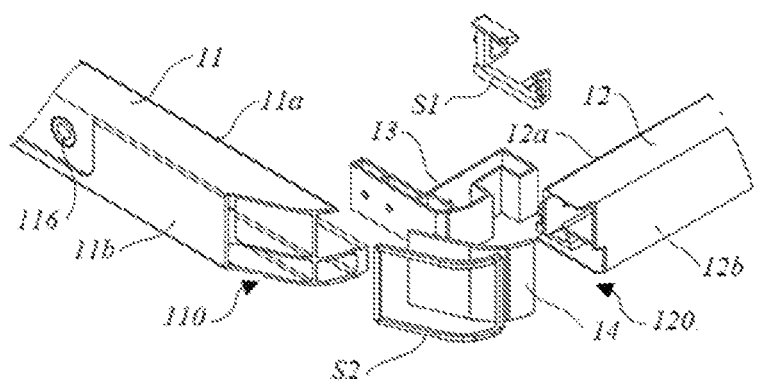
FIG. 6 is a schematic view of a structure of a welding seam of a frame body shown in FIG. 5.

Further, an engaging portion between the first end 110 of the first bracket 11 and the second end 120 of the second bracket 12 is connected with the block 13. Specifically, the engaging portion between the first end 110 of the first bracket 11 and the second end 120 of the second bracket 12 is connected with the block 13 through welding to form a first welding seam 51. The welding quality is high, thereby improving the connection performance of the first bracket 11 and the second bracket 12 and ensuring the connection strength. With reference to FIG. 6, in order to prevent dust and water vapor from entering the battery pack and causing damage to the battery cells and units and further improve the sealing and protection performance of the frame body 1, the frame body 1 provided in an embodiment of the present application further includes a sealing plate 14, a region between an edge of the first end 110 of the first bracket 11 and an edge of the second end 120 of the second bracket 12 is hermetically connected with the sealing plate 14.

Specifically, the region between the edge of the first end 110 of the first bracket 11 and the edge of the second end 120 of the second bracket 12 is connected with the sealing plate 14 through welding to form a second welding seam S2. The requirement on the welding quality of the second welding seam S2 is relatively high, thereby not only improving the connection performance of the sealing plate with the first bracket 11 and the second bracket 12, but also further improving the sealing performance of the frame body 1.

Since the block 13 can be connected respectively with the first bracket 11 and the second bracket 12 through riveting or screw connection, an edge of the block 13 does not need to be connected with the first bracket 11 or the second bracket 12 through welding. Therefore, only an initial welding is performed between the sealing plate 14 and the edges of the first end 110 of the first bracket 11 and the second end 120 of the second bracket 12, avoiding a risk of welding penetration due to a secondary welding problem of the first bracket 11 and the second bracket 12, thereby improving the yield rate.

In order to guarantee the sealing property of the frame body 1, air tightness test needs to be performed on the first bracket 11, the second bracket 12, and the sealing plate 14 after their completion of welding. As described above, since the first separation wall 112 is disposed within the first bracket 11, external impurities, liquid, or the like cannot enter the receiving cavity O through the first mold chamber 111 or thus affect the electrical performance of the battery pack 10, and thus it is not necessary to seal the region between the outer wall 11b and the first separation wall 112. However, the region between the first separation wall 112 and the second outer wall 12b is in communication with both of the first mold chamber 111 and the second mold chamber 121 having a necessity of satisfying the requirement on sealing.

Since the regions of the frame body 1 that need be sealed and the regions of the frame body 1 that do not need to be sealed are both sealed through the sealing plate 14, if the air tightness detection on the frame body 1 is in failure, the specific location of the air leakage cannot be determined. In addition, when under rework, it is necessary to cut off the welded sealing plate 14 first and then re-welding a spare sealing plate 14 to the first bracket 11 and the second bracket 12, thereby severely affecting the appearance of the frame body 1 and the quality of the welding seams.

Since it is not necessary to seal the region between the first outer wall 11b and the first separation wall 112 (that is, the third mold chamber 113 and the fifth mold chamber 115 in FIG. 5), the requirement on the quality of the welding seam can be lowed; however, the region between the first separation wall 112 and the second outer wall 12b needs to satisfy the requirement on sealing in order to ensure that the battery cells and electrical elements are isolated from external dust and water vapor, thus causing the requirement on the quality of the welding seam is relatively high. Thereby, the sealing plate 14 can be divided into two parts, and the air tightness test only needs to be performed on a region required to be sealed after the welding.

Figure 7:
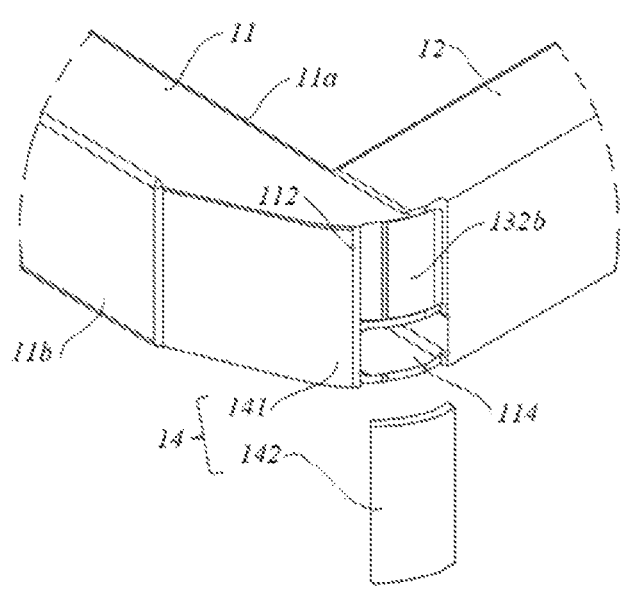
FIG. 7 is a schematic view of a partial exploded structure of another frame body provided by an embodiment of the present application.
Figure 8:
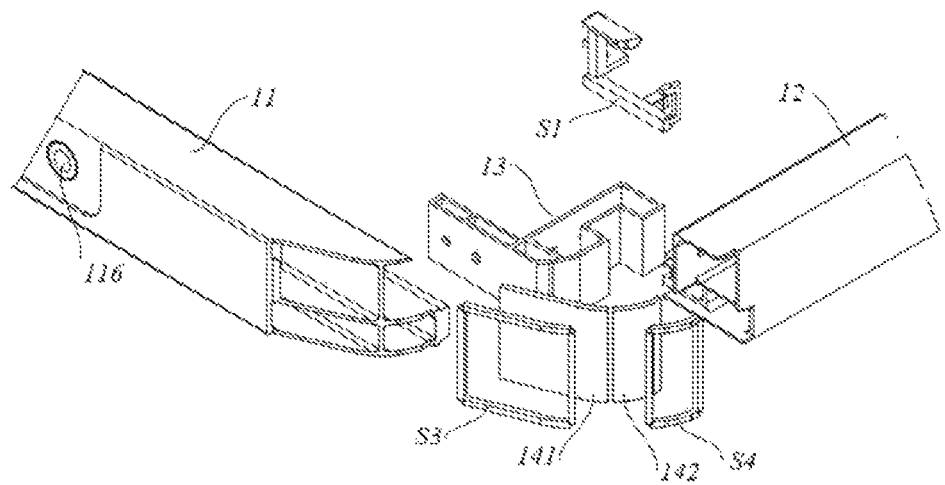
FIG. 8 is a schematic view of a structure of a welding seam of a frame body shown in FIG. 7.

With reference to FIGS. 7 and 8, the sealing plate 14 includes a first sealing plate section 141 and a second sealing plate section 142, a region between the first outer wall 11b and the first separation wall 112 is connected with the first sealing plate section 141, and a region between the first separation wall 112 and the second outer wall 12b is hermetically connected with the second sealing plate section 142.

Specifically, the requirement on the welding quality of a third welding seam S3, which is formed by welding a region between the first outer wall 11b and the first separation wall 112 to the first sealing plate section 141, is relatively low, and the requirement on polishing the stacking welding material of a sealing surface and an assembly surface is relatively low, thereby facilitating the manual control and improving the welding efficiency. However, the requirement on the welding quality of a fourth welding seam S4, which is formed by welding a region between the first separation wall 112 and the second outer wall 12b to the second sealing plate section 142, is relatively high, and it is only necessary to invest a lot of cost to polish the stacking welding material of the sealing surface and the assembly surface when the fourth welding seam S4 is welded.

When the air tightness test is performed on the frame body 1, only the welding quality of the fourth welding seam S4 is needed to be tested, and the leakage amount is generally required to be less than 0.04 Kpa. If there is an abnormality, the leakage point may be observed by applying soapy water to facilitate locating the air leakage which could be then directly repaired by welding without cutting off the sealing plate 14, thereby reducing the complexity of the process, improving the manufacturability of the frame body 1, and increasing the product qualification rate and production efficiency.

An embodiment of the present application proposes a frame body including a first bracket having a first mold chamber; a second bracket connected with the first bracket end to end to form a receiving cavity, the second bracket including a second mold chamber; and a block including a first reinforcement portion and a second reinforcement portion, wherein the first reinforcement portion is received in the first mold chamber, the second reinforcement portion is received in the second mold chamber, and the block is used to connect the first bracket with the second bracket.

In some embodiments, the first bracket includes a first end close to the second bracket, and the first reinforcement portion is received in the first mold chamber of the first end; and the second bracket includes a second end close to the first bracket, and the second reinforcement portion is received in the second mold chamber of the second end.

In some embodiments, the first reinforcement portion is provided with a first positioning portion, the second reinforcement portion is provided with a second positioning portion, the first positioning portion is connected with the first end of the first bracket, and the second positioning portion is connected with the second end of the second bracket.

In some embodiments, sides facing the receiving cavity of the first reinforcement portion and the second reinforcement portion are provided intersecting with each other, and sides away from the receiving cavity of the first positioning portion and the second positioning portion are connected through an inclined plane and/or an arc surface.

In some embodiments, the first bracket includes a first inner wall close to the receiving cavity and a first outer wall away from the receiving cavity, an installation hole is disposed on the first outer wall, and the frame body is connected with an external apparatus through the installation hole.

In some embodiments, a first separation wall is disposed in the first bracket, and the first separation wall divides an internal space of the first bracket into at least two cavities, wherein the wall portion forming the first mold cavity includes at least a part of the first inner wall.

In some embodiments, a second separation wall is disposed in the second bracket, and the second separation wall divides an internal space of the second bracket into at least two cavities, wherein the wall portion forming the second mold chamber includes at least a part of the second inner wall.

In some embodiments, an engaging portion between the first end of the first bracket and the second end of the second bracket is connected with the block.

In some embodiments, the frame body further includes a sealing plate, and a region between an edge of the first end of the first bracket and an edge of the second end of the second bracket is hermetically connected with the sealing plate.

In some embodiments, the sealing plate includes a second sealing plate section, and a region between the first separation wall and the second outer wall is hermetically connected with the second sealing plate section.

Figure 9:
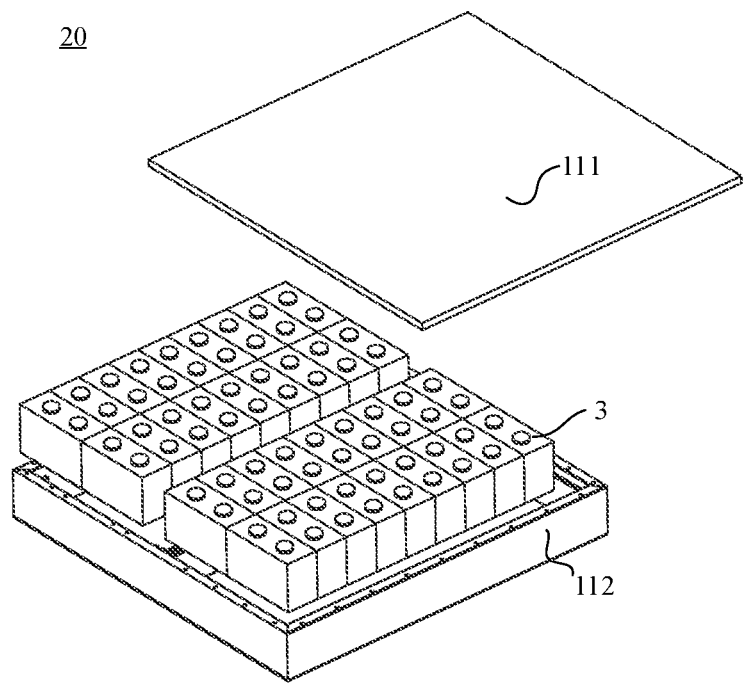
FIG. 9 is a schematic view of an exploded structure of a battery pack disclosed by another embodiment of the present application.
Figure 10:
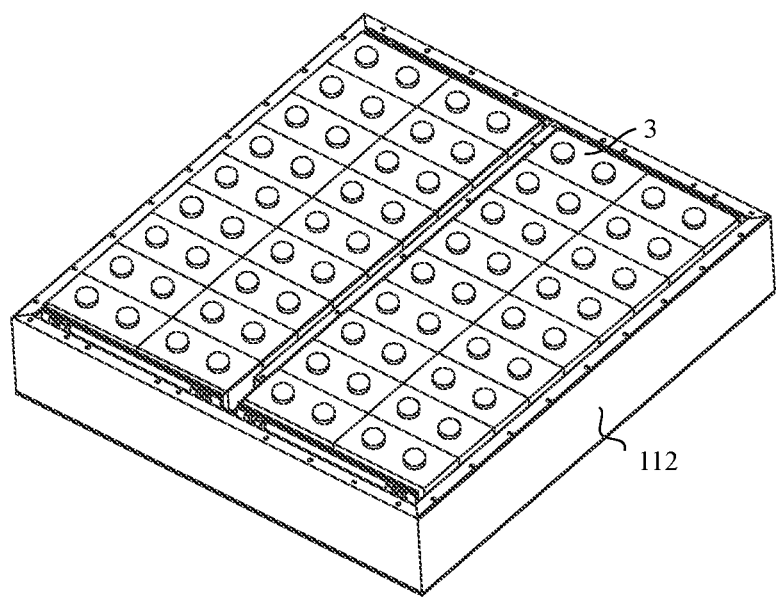
FIG. 10 is an installation diagram of a second component and a battery pack in FIG. 9.

FIG. 9 is a schematic view of an exploded structure of a battery pack disclosed by another embodiment of the present application. In this embodiment, the upper housing 2 is realized as a first component 111, and the lower housing 10 is realized as the second component 112. FIG. 10 is an installation diagram of the second component and the battery pack in FIG. 9.

The housing of the battery pack 20 in another embodiment of the present application may further have other shapes. For example, as shown in FIG. 9, the housing may include two parts, which are referred to herein as a first component 111 and a second component 112 (or may also be referred to as an upper housing and a lower housing), and the first component 111 and the second component 112 are buckled and engaged together. The shapes of the first component 111 and the second component 112 may be determined according to the combined shape of a plurality of battery cells 3, and at least one of the first component 111 and the second component 112 includes an opening. For example, only one of the first component 111 and the second component 112 included by the housing may be a hollow cuboid having an opening, and the other one may be in a plate shape to cover and enclose the opening. For example, as shown in FIGS. 9 and 10, a case in which the second component 112 as a hollow cuboid and only one surface of it has an opening and the first component 111 in a plate shape is taken as an example herein, the first component 111 covers and encloses the opening of the second component 112 to form a housing having an enclosed chamber, which can be used to receive a plurality of battery cells 3.

Figure 11:
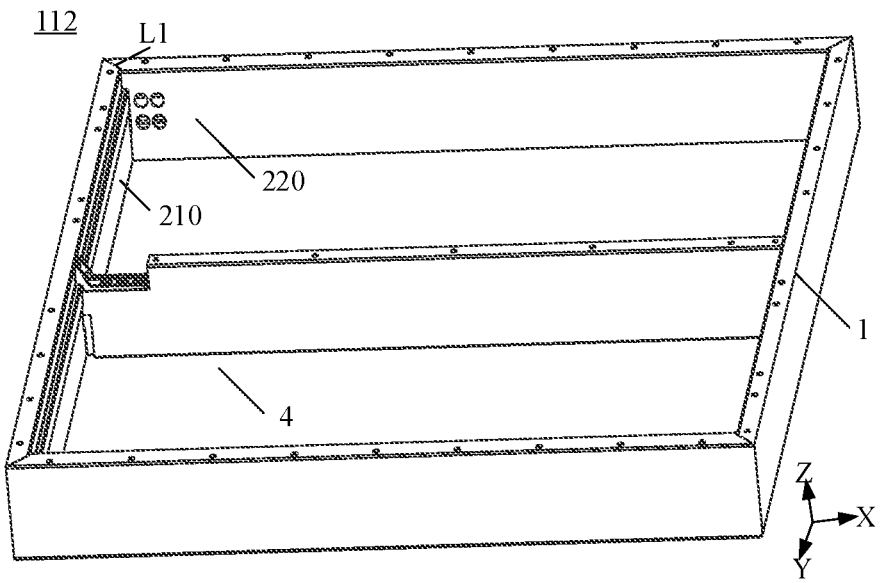
FIG. 11 is a schematic view of a second component disclosed by another embodiment of the present application.
Figure 12:
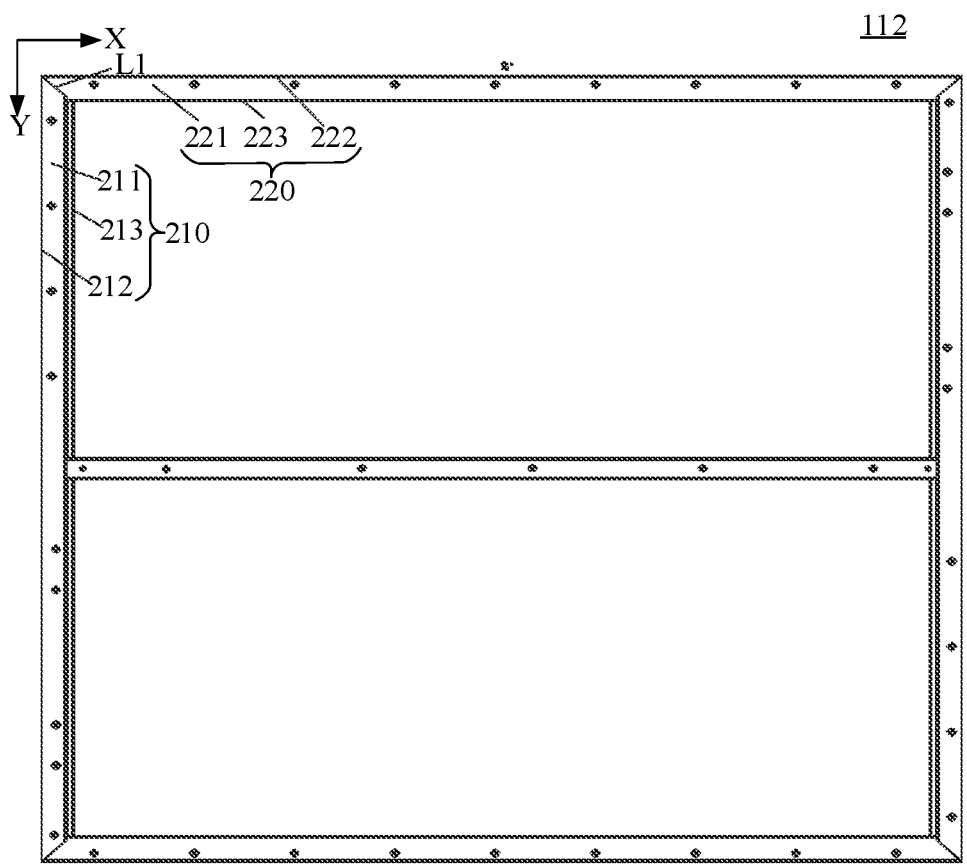
FIG. 12 is a top view of a second component in FIG. 11.
Figure 13:
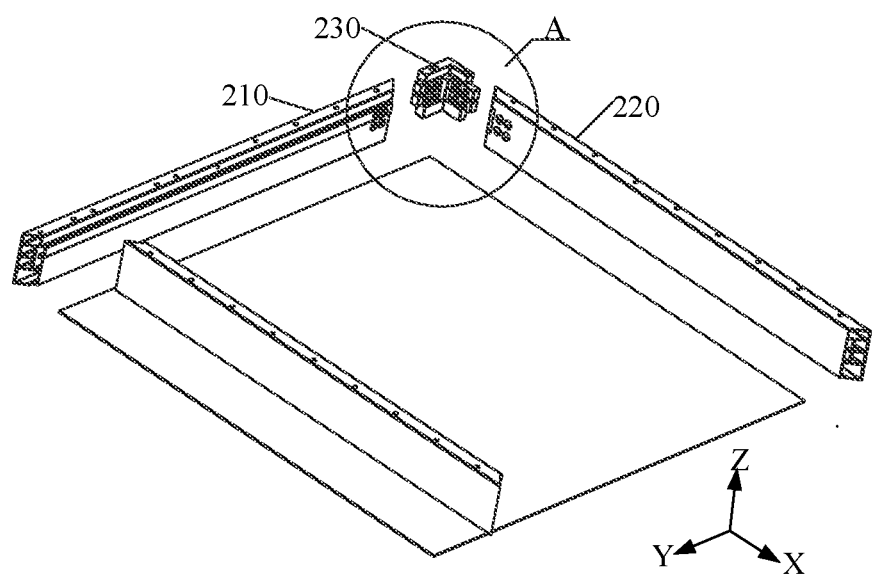
FIG. 13 is a partial exploded view of a second component shown in FIG. 12.
Figure 14:
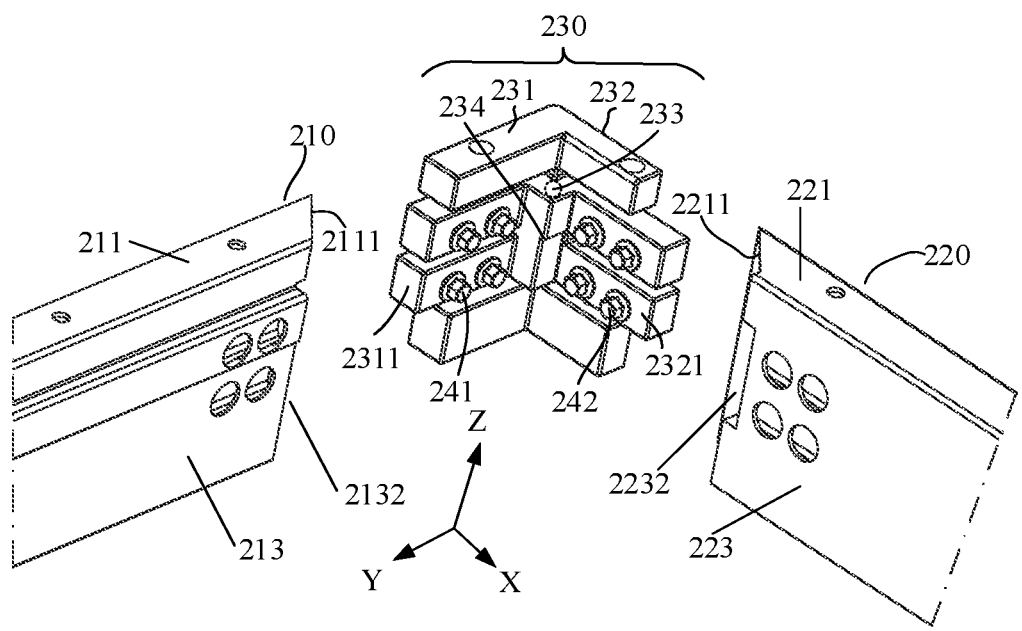
FIG. 14 is a partial enlarged view of a region A in FIG. 13.

FIG. 11 is a schematic view of a second component disclosed by another embodiment of the present application, FIG. 12 is a schematic top view of a structure of the second component in FIG. 11, and FIG. 13 is a partial exploded view of the second component shown in FIG. 12, and FIG. 14 is a partial enlarged view of a region A in FIG. 13. In this embodiment, the frame body 1 is realized as a plurality of walls, the first bracket 11 is realized as a first wall 210, the second bracket 12 is realized as a second wall 220, the block 13 is realized as a reinforcement structure 230, the first reinforcement portion 131 is realized as a first part 231, and the second reinforcement portion 132 is realized as a second part 232.

Figure 15:
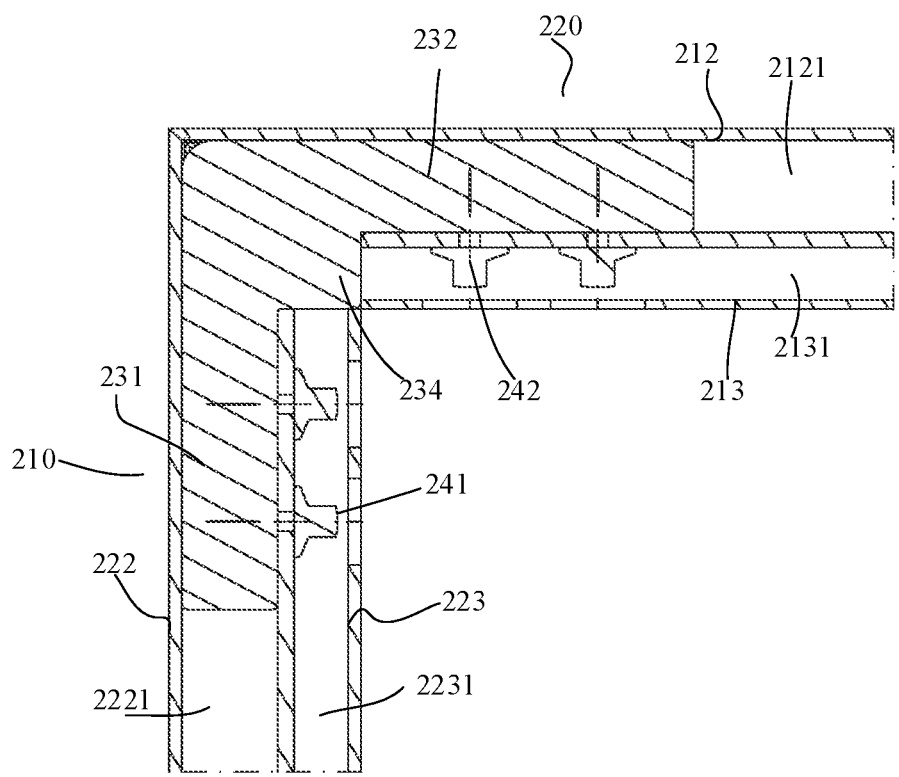
FIG. 15 is a partial cross-sectional view of an upper left corner region in FIG. 12.

As shown in FIGS. 11 to 14, the second component 112 includes a plurality of walls, which may form a receiving cavity. In the drawings, taking a case in which the second component 112 as a hollow cuboid as an example, said plurality of walls of the second component 112 are four side walls. In addition, the second component 112 further includes a bottom plate 4, and the bottom plate and the four side walls form the second component 112. FIG. 15 is a partial cross-sectional view of an upper left corner region in FIG. 12. The cross-sectional view is obtained by cutting a middle position of the housing along a plane parallel to the bottom plate 4 of the housing.

For convenience of description, herein, the description is made by taking any two intersecting walls included by the second component 112 as an example, and they are referred to as the first wall 210 and the second wall 220 respectively. As shown in FIGS. 11 to 15, if the second component 112 is a cuboid, the first wall 210 and the second wall 220 are perpendicular to each other. On the contrary, if the second component 112 is in a shape of another type of polygons, the first wall 210 and the second wall 220 may also have other positional relationships, which are not limited in the embodiments of the present application.

For convenience of description, the present application is described by taking a case in which the first wall 210 and the second wall 220 shown in FIGS. 11 to 15 are perpendicular to each other as an example, and an extension direction of the first wall 210 or a length direction of the first wall 210 is defined as a second direction, which is denoted as Y; an extension direction of the second wall 210 or a length direction of the second wall 210 is defined as a first direction, which is denoted as X; and a height direction of the first wall 210 or a height direction of the second wall 220 is defined as a third direction, which is denoted as Z. Also, in a case where the second component 112 is a cuboid, the three directions X, Y, and Z are perpendicular to one another.

As shown in FIGS. 11 to 15, the second component 112 further includes a reinforcement structure 230, which includes a first part 231 and a second part 232 connected with each other. Specifically, the first wall 210 includes a first mold chamber therein, and the second wall 220 includes a second mold chamber therein, the first part 231 of the reinforcement structure 230 is received in the first mold chamber of the first wall 210 and fixed to the first wall 210, and the second part 232 of the reinforcement structure 230 is received in the second mold chamber of the second wall 220 and fixed to the second wall 220, thereby realizing the fixing of the first wall 210 to the second wall 220.

As shown in FIGS. 11 to 15, the first wall 210 of an embodiment of the present application includes two side walls arranged along the first direction X and a first outer top wall 211, wherein the two sides walls of the first wall 210 are a first outer side wall 212 and a first internal portion wall 213 respectively, the first outer side wall 212 is an outer wall of the frame body 1, the first internal portion wall 213 is an inner wall of the frame body 1, and the first outer top wall 211 is the outer wall for connecting the two side walls of the first wall 210 and the outermost wall of the first wall 210 along the third direction Z. Similarly, the second wall 220 of an embodiment of the present application includes two side walls arranged along the second direction Y and a second outer top wall 221, wherein the two side walls of the second wall 220 are a second outer side wall 222 and a second internal portion wall 223 respectively, the second outer side wall 222 is an outer wall of the frame body 1, the second internal portion wall 223 is an inner wall of the frame body 1, and the second outer top wall 221 is the outer wall for connecting the two side walls 222 and 223 of the second wall 220 and the outermost wall of the second wall 220 along the third direction Z.

In an embodiment of the present application, as shown in FIGS. 11 to 15, the first outer top wall 211 is welded to the second outer top wall 221, and an end portion in a welding line of the first outer top wall 211 and the second outer top wall 221 close to the inner portion of the frame body 1 is defined as a first line segment L11; and an outer surface of the reinforcement structure 230 includes a first region 233, and an orthographic projection of the first line segment L11 on a plane where the first region 233 is located falls within the first region 233. That is, the reinforcement structure 230 is closer to the inner portion of the frame body 1 than the welding line L1.

Therefore, the frame body 1 of the second component 112 of an embodiment of the present application includes a plurality of walls, the reinforcement structure 230 may be disposed between any arbitrarily intersecting first wall 210 and second wall 220, the reinforcement structure 230 can be disposed in the cavities of the first wall 210 and the second wall 220 to connect and fix the first wall 210 and the second wall 220, thereby greatly increasing the rigidity and strength between first wall 210 and the second wall 220 and reducing the stress between the first wall 210 and the second wall 220 without occupying the internal space of the frame body 1. In addition, the first outer top wall 211 of the first wall 210 and the second outer top wall 221 of the second wall 220 are welded, and for the first line segment L11 of the end portion of the welding seam close to the inner portion of the second component 112, the reinforcement structure 230 has such a first region 233 thereon that the orthographic projection of the first line segment L11 on the plane where the first region 233 is located falls within the first region 233, thus when the frame body 1 is subjected to an expansion force of the battery cell 3 or other forces from the inner portion of the frame body 1 towards the outside, these forces will first act on the reinforcement structure 230, thereby reducing the force applied on the first line segment L11 and solving the problem that the wall of the frame body 1 is prone to failure under the action of the expansion force or other forces from the inner part of the frame body 1 towards the outside due to the low strength of the welding seam.

The embodiments of the present application will be described in detail in conjunction with the drawings below.

Figure 16:
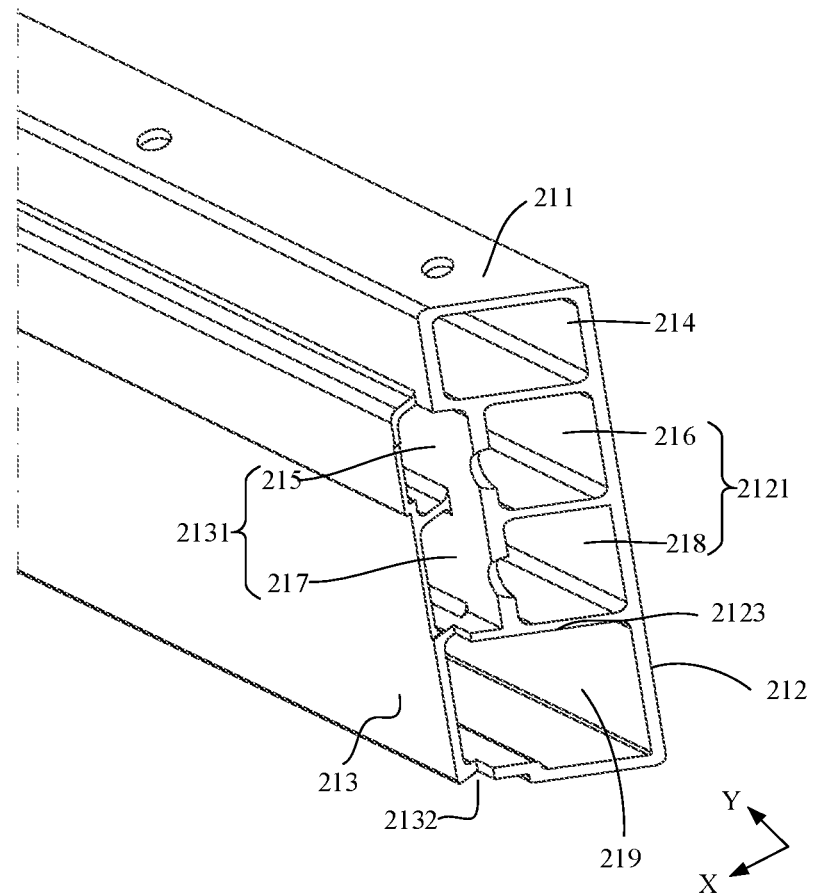
FIG. 16 is a schematic cross-sectional view of a first wall disclosed by an embodiment of the present application.

In an embodiment of the present application, the first wall 210 may be any one wall in the frame body 1, and thus the description is mainly made by taking the first wall 210 as an example as below. FIG. 16 is a schematic cross-sectional view of the first wall of an embodiment of the present application. As shown in FIGS. 14 to 16, the outer wall of the first wall 210 includes a first internal portion wall 213, a first outer side wall 212, and a first outer top wall 211, the first wall 210 further includes a first connecting wall 2123 therein, the first connecting wall 2123 is used to connect at least two walls of the first internal portion wall 213, the first outer side wall 212, and the first outer top wall 211, and the position and shape of the first connecting wall 2123 are appropriately disposed, a plurality of cavities can be formed inside the first wall 210, for example, the first connecting wall 2123 provided in the drawings forms the cavities 214 to 219 of the first wall 210.

Specifically, as shown in FIGS. 14 to 16, the thickness of the first wall 210 along the first direction X may be uniform or non-uniform, that is to say, the first internal portion wall 213 or the first outer side wall 212 may be even or uneven. For example, the surface of the first internal portion wall 213 or the first outer side wall 212 may include recessed regions or raised regions. Optionally, in the drawings, a case in which the surface of the first internal portion wall 213 is uneven while the surface of the first outer side wall 212 is even is taken as an example, and there may alternatively be differences between different walls of the frame body 1, for example, in the drawings, the surface of the first internal portion wall 213 of the first wall 210 is uneven while the surface of the second internal portion wall 223 of the second wall 220 is even, and the embodiments of the present application are not limited thereto.

Optionally, the inner and outer side walls of the same wall of the frame body 1 may be parallel or non-parallel, for example, the first internal portion wall 213 and the first outer side wall 212 may be parallel or non-parallel. Also, considering that the surface of each wall of the frame body 1 may have uneven regions, local regions of the inner and outer side walls of the same wall may be parallel or non-parallel. For convenience of description, the description is made mainly by taking a case in which the first internal portion wall 213 and the first outer side wall 212 are parallel or approximately parallel as an example, but the embodiments of the present application are not limited thereto.

In an embodiment of the present application, the walls inside each wall can be disposed according to actual applications, and different walls can also be disposed to be the same or different. For example, the first connecting wall 2123 inside the first wall 210 can be disposed according to actual applications. For example, the first connecting wall 2123 may include a wall perpendicular to the first internal portion wall 213 and the first outer side wall 212, or may further include a wall parallel to the first internal portion wall 213 and the first outer side wall 212, or may further include a wall inclined relatively to the first internal portion wall 213 and the first outer side wall 212 to form a plurality of cavities 214 to 219 located at different positions.

Correspondingly, in an embodiment of the present application, the cavities included by different walls may also be the same or different. For example, corresponding to the distribution of the first connecting wall 2123, the numbers, dimensions, and shapes of a plurality of cavities 214 to 219 of the first wall 210 can also be set according to practical situations. For example, the shapes and the dimensions of a plurality of cavities 214 to 219 may be the same or different, and in the drawings, a case in which the shapes of the plurality of cavities 214 to 219 are the same while the dimensions are different is taken as an example, and the axes of the cavities are parallel to each other, but the embodiments of the present application are not limited thereto.

In order to facilitate processing, in an embodiment of the present application, the first internal portion wall 213, the first outer side wall 212, the first outer top wall 211, and the first connecting wall 2123 included by the first wall 210 may be formed as an integral structure, or at least two of the first internal portion wall 213, the first outer side wall 212, the first outer top wall 211, and the first connecting wall 2123 are formed as an integral structure, but the embodiments of the present application are not limited thereto.

Optionally, as shown in FIGS. 14 to 16, the first wall 210 may further include a first hollow cavity, and the first hollow cavity and the first mold chamber are arranged along the first direction X. For example, the first wall 210 in the drawings includes the first mold chamber 2121 and the first hollow cavity 2131, wherein a column of first hollow cavity 2131 close to the inner portion of the frame body 1 may include two first cavities 215 and 217, while a column of first mold chamber 2121 close to the outside of the frame body 1 may include two first mold chambers 216 and 218. Similarly, the second wall 220 may further include a second hollow cavity, and the second hollow cavity and the second mold chamber are arranged along the second direction Y. The column of second hollow cavity may include at least one second hollow cavity, and the column of second mold chamber may include at least one second mold chamber, for example, a column of second mold chamber 2221 and a column of second hollow cavity 2231 in the drawings.

In an embodiment of the present application, the reinforcement structure 230 may be located in at least one column of first hollow cavity, and similarly, the reinforcement structure 230 may also be located in at least one column of second mold chamber. For example, an embodiment of the present application mainly takes FIGS. 14 to 16 as an example, and the first part 231 of the reinforcement structure 230 can be received in the column of first mold chamber 2121 close to the outside of the frame body 1. Similarly, the second part 232 of the reinforcement structure 230 is received inside the column of second mold chamber 2221 close to the outside of the frame body 1, but the embodiments of the present application are not limited thereto.

It should be understood that the frame body 1 of an embodiment of the present application may further include a first connecting member 241 and a second connecting member 242, wherein the first connecting member 241 is used to fix the first part 231 to the first wall 210, and the second connecting member 242 is used to fix the second part 232 to the second wall 220.

Optionally, in an embodiment of the present application, the first connecting member 241 and the second connecting member 242 may be fasteners or expansion glue. As shown in FIGS. 14 to 16, the context is mainly described by taking the case, in which the first connecting member 241 and the second connecting member 242 are fasteners, as an example, the fastener may include a head and a connecting member, and may be a bolt, a screw, a rivet, or the like, but the embodiments of the present application are not limited thereto.

Optionally, the numbers and positions of the first connecting member 241 and the second connecting member 242 may be set according to practical situations, for example, the numbers and positions of the first connecting member 241 and the second connecting member 242 may be determined according to the positions and disposing way of the reinforcement structure 230.

Specifically, the first part 231 of the reinforcement structure 230 may include a plurality of first reinforcement blocks, and correspondingly, the first wall 210 may include one or more first mold chambers, each of said plurality of first reinforcement blocks is received in a corresponding first mold chamber, while one first hollow cavity may include one or more first reinforcement blocks therein. For example, as shown in FIGS. 14 to 16, the first part 231 may include four first reinforcement blocks 2311, which are arranged along the third direction Z and correspond to the 4 first mold chambers 214, 216, 218, and 219 of said plurality of cavities 214 to 219 included by the first wall 210 respectively.

Similarly, the second part 232 of the reinforcement structure 230 may further include a plurality of second reinforcement blocks, and correspondingly, the second wall 220 may include one or more second mold chambers, each of said plurality of second reinforcement blocks is received in a corresponding second mold chamber, while one second mold chamber may include one or more second reinforcement blocks. For example, as shown in FIGS. 14 to 16, the second part 232 may include four second reinforcement blocks 2321, which are arranged along the third direction Z and correspond to the four second mold chamber of the second wall 220 respectively.

Optionally, as shown in FIGS. 14 to 16, in a case where the axes of a plurality of first mold chambers included by the first wall 210 are parallel to each other, the axes of said plurality of first reinforcement blocks 2311 are also parallel to each other. In a case where the axes of said plurality of second mold chambers included by the second wall 220 are parallel to each other, the axes of said plurality of second reinforcement blocks 2321 are also parallel to each other.

Optionally, the dimensions and shapes of a plurality of first reinforcement blocks 2311 may be adapted to a plurality of first mold chambers, and the dimensions and shapes of said plurality of second reinforcement blocks 2321 may be adapted to said plurality of second mold chambers; and in addition, the lengths of said plurality of first reinforcement blocks 2311 along the second direction Y may be the same or different, and the lengths of said plurality of second reinforcement blocks 2321 along the first direction X may also be the same or different. For example, as shown in FIGS. 14 to 16, the shapes of the 4 first reinforcement blocks 2311 may also be the same, but the lengths along the second direction Y are different, and the shapes of the four second reinforcement blocks 2321 can alternatively be the same, but the lengths along the second direction Y are different.

It should be understood that regarding the disposing ways of a plurality of first reinforcement blocks 2311 and a plurality of second reinforcement blocks 2321 as shown in FIGS. 14 to 16, in a case where the first part 231 is received in the column of first mold chamber 2121 close to the outside of the frame body 1, the head of the first connecting member 241 may be located in the column of first hollow cavity 2131 close to the inner portion of the frame body 1. Similarly, in a case where the second part 232 is received in the column of second mold chamber 2221 close to the outside of the frame body 1, the head of the second connecting member 242 may be located in the column of second hollow cavity 2231 close to the inner portion of the frame body 1.

In addition, the numbers of the first connecting member 241 and the second connecting member 242 can be set according to practical situations. For example, the first connecting member 241 may be disposed on at least one first reinforcement block 2311, wherein one or more first connecting members 241 are disposed on one first reinforcement block 2311, and the numbers of the first connecting members 241 on different first reinforcement blocks 2311 may be the same or different, so that the first part 231 is fixed to the first wall 210. Similarly, the second connecting member 242 may be disposed on at least one second reinforcement block 2321, wherein one or more second connecting members 242 are disposed on one second reinforcement block 2321, and the numbers of the second connecting members 242 on the different second reinforcement blocks 2321 may be the same or different, so that the second part 232 is fixed to the second wall 220.

For example, as shown in FIGS. 14 to 16, two first connecting members 241 arranged along the second direction Y may be disposed on the two first reinforcement blocks 2311 in the middle of the four first reinforcement blocks 2311 respectively, and two second connecting members 242 arranged along the first direction X are disposed on the two second reinforcement blocks 2321 in the middle of the four second reinforcement blocks 2321 respectively, but the embodiments of the present application are not limited thereto.

Regarding the distribution positions of one or more first connecting members 241 on any one first reinforcement block 2311, a distance between a position of each of the one or more first connecting members 241 and the first end of the corresponding first reinforcement block accounts a length of one-sixth to one-half of the corresponding first reinforcement block in the second direction Y, and the first end is an end of the corresponding first reinforcement block away from the second wall 220. Similarly, for the distribution positions of one or more second connecting members 242 on any one second reinforcement block 2321, a distance between a position of each of the one or more second connecting members 242 and a second end of the corresponding second reinforcement block accounts a length of one-sixth to one-half of the corresponding second reinforcement block in the first direction X, and the second end is an end of the corresponding second reinforcement block away from the first wall 210.

In addition, in a case where the plurality of first connecting members 241 are disposed on one first reinforcement block 2311, the intervals between a plurality of first connecting members 241 may be the same or different, and similarly, in a case where said plurality of second connecting members 242 are provided on one second reinforcement block 2321, the intervals between said plurality of second connecting members 242 may be the same or different.

Reasonably setting the positions and numbers of the first connecting member 241 and the second connecting member 242 can effectively improve the strength and the stability between the reinforcement structure 230 and the first wall 210 and between the reinforcement structure 230 and the second wall 220, thereby reducing the risk of failure of the frame body 1.

It should be understood that, as shown in FIGS. 14 to 16, the reinforcement structure 230 further includes a raised portion 234, which protrudes from the intersecting portion of the first portion 231 and the second portion 232 towards the inner portion of the frame body 1, and an outer surface of which includes a first region 233, for example, the first region 233 may be located on the upper surface of the raised portion 234 along the third direction Z shown in FIG. 14, so that the orthographic projection of the first line segment L11 in the welding line of the first outer top wall 211 and the second outer top wall 221 close to the inner portion of the frame body 1 on the plane where the first region 233 is located falls within the first region 233, but the embodiments of the present application are not limited thereto.

Optionally, the position and height of the raised portion 234 along the third direction Z can be set according to practical situations. For example, the position of the raised portion 234 may be set according to the position of the first reinforcement block, the first part 231 of which is provided with the first connecting member 241, and the position of the second reinforcement block, the second part 232 of which is provided with the second connecting member 242. For example, as shown in FIGS. 14 to 16, in a case where the first connecting member 241 and the second connecting member 242 are each disposed on the two first reinforcement blocks 2311 and the two second reinforcement blocks 2321 which are in a middle position, the raised portion 234 may protrude towards the inner portion of the frame body 1 from the intersecting portions of the two first reinforcement blocks 2311 and the two second reinforcement blocks 2321 which are in a middle position.

It should be understood that, considering the disposing position of the raised portion 234, a notch region may be disposed at the corresponding positions of the first wall 210 and the second wall 220 and used to avoid the raised portion 234. For example, as shown in FIGS. 14 to 16, a first notch region 2132 may be disposed on the first internal portion wall 213 of the first wall 210, a second notch region 2232 may be disposed on the second internal portion wall 223 of the second wall 220, and the two notch regions are used to avoid the raised portion 234.

Optionally, the heights of the first notch region 2132 and the second notch region 2232 in the third direction Z are greater than or equal to the height of the raised portion 234 in the third direction Z to avoid the raised portion 234. The height of the first notch region 2132 in the third direction Z and the height of the second notch region 2232 in the third direction Z may be the same or different. For example, as shown in FIGS. 14 to 16, in the third direction Z, the second notch region 2232 may be located in a middle region of the second internal portion wall 223, and the height of the second notch region 2232 in the third direction Z may be set to be equal to or slightly greater than the height of the raised portion 234 in the third direction Z; while the first notch region 2132 is located in the middle and lower region of the first internal portion wall 213 in the third direction Z, and the height of the first notch region 2132 in the third direction Z is significantly greater than the height of the raised portion 234 in the third direction Z.

In an embodiment of the present application, the raised portion 234 includes a first region 233 thereon, so that the orthographic projection of the first line segment L11 in the welding line of the first outer top wall 211 and the second outer top wall 221 close to the inner portion of the frame body 1 on the plane where the first region 233 is located falls within the first region 233. Specifically, the first outer top wall 211 and the second outer top wall 221 are fixed through welding, and since the thickness of the first wall 210 in the first direction X and the thickness of the second wall 220 in the second direction Y may be the same or different, the position of the welding line between the first outer top wall 211 and the second outer top wall 221 can be flexibly disposed according to practical applications.

Figure 17:
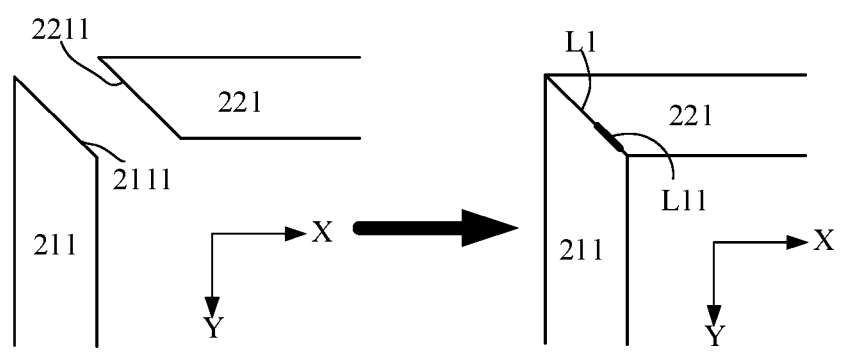
FIG. 17 is a schematic view of a fixing way between a first outer top wall of a first wall and a second outer top wall of a second wall disclosed by an embodiment of the present application.
Figure 18:
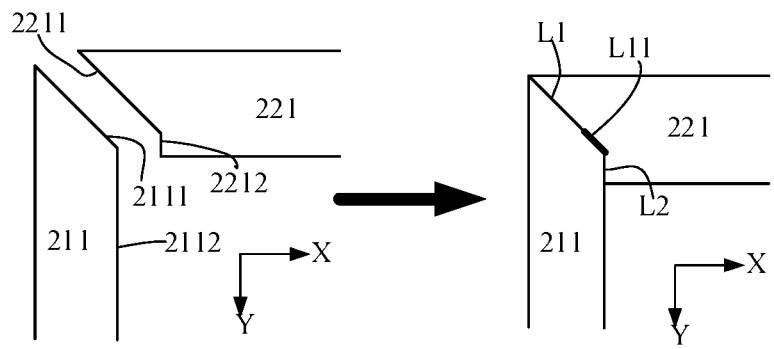
FIG. 18 is a schematic view of another fixing way between a first outer top wall of a first wall and a second outer top wall of a second wall disclosed by an embodiment of the present application.

For example, FIGS. 17 and 18 respectively show schematic views of different fixing ways between the first outer top wall 211 of the first wall 210 and the second outer top wall 221 of the second wall 220. As shown in FIG. 10, the thickness of the first wall 210 along the first direction X and the thickness of the second wall 220 along the second direction Y may be the same, so when the first outer top wall 211 of the first wall 210 and the second outer top wall 221 of the second wall 220 are welded to each other, a first edge 2111 on the first outer top wall 211 and a second edge 2211 on the second outer top wall 221 can be welded to form a welding line L1, and a section of the welding line L1 close to the inner portion of the frame body 1 is defined as a first line segment L11, the length of which is smaller than that of the welding line L1.

Specifically, regarding the intersecting line of the first edge 2111 and the second edge 2211, the length of the welding line L1 may be less than or equal to that of the intersecting line. For example, considering the thickness of the first internal portion wall 213 and the second internal portion wall 223, as shown in FIG. 17, an end of the intersecting line of the first edge 2111 and the second edge 2211 close to the inner portion of the frame body 1 may not be welded, and then the length of the welding line L1 is smaller than that of the intersecting line of the first edge 2111 and the second edge 2211. In this case, the position of the first line segment L11 at the end of the welding line L1 close to the inner portion of the frame body 1 is shown in FIG. 17, that is, in FIG. 17, a section on the intersecting line of the first edge 2111 and the second edge 2211 closer to the inner portion of the frame body 1 than the first line segment L11 is not welded.

Optionally, as shown in FIG. 18, the thickness of the first wall 210 along the first direction X and the thickness of the second wall 220 along the second direction Y may be different, and herein the description is made by taking the case in which the thickness of the second wall 220 is greater than that of the first wall 210 as an example. When the first outer top wall 211 of the first wall 210 and the second outer top wall 221 of the second wall 220 are welded to each other, the first edge 2111 on the first outer top wall 211 and the second edge 2211 of the second outer top wall 221 can be welded alike to form the welding line L1, and a section in the welding line L1 close to the inner portion of the frame body 1 is defined as the first line segment L11, the length of which is smaller than that of the welding line L1. At the same time, the start and end position for welding may be distinguished from the second edge 2211, thereby ensuring that the projection of the first line segment L11 at the end portion of the welding line L1 along the third direction Z falls on the reinforcement structure 230.

In addition, due to the difference in thicknesses, as shown in FIG. 18, there is a third edge 2112 connected with the first edge 2111 on the first outer top wall 211, the third edge intersects a fourth edge 2212 on the second outer top wall 221 connected with the second edge 2211, a line segment of the intersecting portion is defined as a second line segment L2, and the first line segment L11 intersects non-collinearly with the second line segment L2, for example, the position relationship of the first line segment L11 and the second line segment L2 may be shown in FIG. 18, so that the first internal portion wall 213 and the second internal portion wall 223 can be abutted against each other to ensure the sealing performance of the first wall 210 and the second wall 220. The second line segment L2 is usually not welded, and the third edge 2112 and the fourth edge 2212 abut against each other, but the embodiments of the present application are not limited thereto.

It can be understood that the first wall 210 and the second wall 220 may have only one column of first mold chamber and one column of second mold chamber respectively, and the reinforcement structure 230 is formed as an L-shaped structure, the two parts of which are respectively received in the first mold chamber of the first wall 210 and the second mold chamber of the second wall 220, respectively filling the first wall 210 along the first direction X and the second wall 220 along in the second direction Y. Alternatively, the first wall 210 and the second wall 220 possess multiple columns of first mold chambers and multiple columns of second mold chambers respectively, and the two parts of the reinforcement structure 230 are respectively received in multiple columns of first mold chambers of the first wall 210 and multiple columns of second mold chamber of the second wall 220, respectively filling the multiple columns of first mold chambers of the first wall 210 along the first direction Z and filling the multiple columns of second mold chambers of the second wall 220 along the second direction Y. For the above situation, in this case, the projection of the welding start end of the first line segment L11 on the reinforcement structure 230 in the height direction can still be located onto the reinforcement structure 230. For example, it can still be located onto the surface of the reinforcement structure 230 facing the first outer top wall 211 or the second outer top wall 221, thereby strengthening the connection between the first wall 210 and the second wall 220 alike and reducing a risk of failure of the welding seam between the first outer top wall 211 and the second outer top wall 221.

Therefore, regarding the frame body of the battery of the embodiments of the present application, the reinforcement structure 230 is disposed in the intersecting first mold chamber of the first wall 210 and the second mold chamber of the second wall 220, to connect and fix the first wall 210 and the second wall 220, thereby greatly increasing the rigidity and strength between the first wall 210 and the second wall 220 and reducing the stress between the first wall 210 and the second wall 220 without occupying the internal space of the frame body 1. In addition, the first outer top wall 211 of the first wall 210 and the second outer top wall 221 of the second wall 220 are welded, while regarding the first line segment L11 at the end portion of the welding seam close to the inner portion of the frame body 1, the reinforcement structure 230 includes such a first region 233 thereon that the orthographic projection of the first line segment L11 on the plane where the first region 233 is located falls within the first region 233, so that when the frame body 1 is subjected to an expansion force of the battery cell 3 or other forces from the inner portion of the frame body 1 to the outside, these forces will first act on the reinforcement structure 230, thereby reducing the force applied on the first line segment L11 and further solving the problem that the wall of the frame body 1 is prone to failure under the action of the expansion force or other forces from the inner portion of the frame body 1 to the outside due to the low strength of the welding seam.

The frame body, the battery pack, and the electrical device of the embodiments of the present application are described above, and the method and device for producing the frame body of the battery of the embodiments of the present application will be described below, wherein the parts that are not described in detail can refer to the individual foregoing embodiments.

Figure 19:
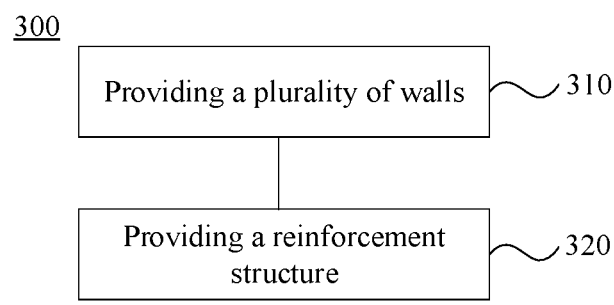
FIG. 19 is a schematic flowchart of a method for producing a frame body of a battery pack disclosed by an embodiment of the present application.

FIG. 19 shows a schematic flowchart of a method for producing a frame body of a battery pack according to an embodiment of the present application. As shown in FIG. 19, the method 300 may include, S310, providing a plurality of first walls and a plurality of second walls to form a receiving cavity of the frame body, wherein a first mold chamber is included within the first wall, a second mold chamber is included within the second wall, the first wall includes a first outer top wall, the second wall includes a second outer top wall, the first outer top wall is welded to the second outer top wall, and an end portion in a welding line between the first outer top wall and the second outer top wall close to an inner portion of the frame body is defined as a first line segment; and, S320, providing a reinforcement structure, which includes a first part and a second part which are connected, the first part being received in the first mold chamber of the first wall and fixed to the first wall, and the second part being received in the second mold chamber of the second wall and fixed to the second wall, wherein an outer surface of the reinforcement structure includes a first region, and an orthographic projection of the first line segment on a plane where the first region is located falls within the first region.

Figure 20:
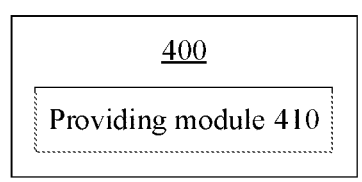
FIG. 20 is a schematic block view of a device for producing a frame body of a battery pack disclosed by an embodiment of the present application.

FIG. 20 shows a schematic block view of a device for producing a frame body of a battery pack according to an embodiment of the present application. As shown in FIG. 20, the device may include a providing module 410. The providing module 410 is used to provide a plurality of first walls and a plurality of second walls to form a receiving cavity of the frame body, a first mold chamber is included within the first wall, a second mold chamber is included within the second wall, the first wall includes a first outer top wall, the second wall includes a second outer top wall, the first outer top wall is welded to the second outer top wall, and an end portion of a welding line between the first outer top wall and the second outer top wall close to an inner portion of the frame body is defined as a first line segment; and to provide a reinforcement structure, which includes a first part and a second part which are connected, the first part is received in the first mold chamber of the first wall and fixed to the first wall, the second part is received in the second mold chamber and fixed to the second wall, wherein an outer surface of the reinforcement structure includes a first region, and an orthographic projection of the first line segment on a plane where the first region is located falls within the first region.

An embodiment of the present application provides a frame body including a plurality of walls to form a receiving space of the frame body, said plurality of walls including a first wall and a second wall which intersect, the first wall including a first mold chamber therein, the second wall including a second mold chamber therein, the first wall including a first outer top wall, the second wall including a second outer top wall, the first outer top wall being welded to the second outer top wall, and an end in the welding line between the outer top wall and the second outer top wall close to an inner portion of the frame body being defined as a first line segment; and a reinforcement structure including a first part and a second part, the first part being received in the first mold chamber and fixed to the first wall, and the second part being received in the second mold chamber and fixed to the second wall, wherein an outer surface of the reinforcement structure includes a first region, and an orthographic projection of the first line segment on a plane where the first region is located falls within the first region.

In some embodiments, the intersecting line of the first outer top wall and the second outer top wall further includes a second line segment, and the first line segment intersects non-collinearly with the second line segment.

In some embodiments, the first wall includes two side walls arranged along a first direction, the first outer top wall is an outer wall for connecting the two side walls of the first wall, the first wall further includes a first hollow cavity, and the first hollow cavity and the first mold chamber are arranged along the first direction; and the second wall includes two side walls arranged along a second direction, the second outer top wall is an outer wall for connecting the two side walls of the second wall, the second wall further includes a second hollow cavity, and the second hollow cavity and the second mold chamber are arranged along the second direction.

In some embodiments, the frame body further includes a first connecting member for fixing the first part to the first wall; and a second connecting member for fixing the second part to the second wall.

In some embodiments, the first connecting member includes a head and a connecting portion, the first mold chamber and the first hollow cavity each is arranged in a column, the first mold chamber is disposed close to an outer side of the frame body, the first hollow cavity is disposed close to an internal portion of the frame body, and the first hollow cavity is used to receive the head of the first connecting member; and the second connecting member includes a head and a connecting portion, the second mold chamber and the second hollow cavity are arranged in a column, the second mold chamber is disposed close to the outer side of the frame body, the second hollow cavity is disposed close to the internal portion of the frame body, and the second hollow cavity is used to receive the head of the second connecting member.

In some embodiments, the reinforcement structure includes a raised portion protruding from the intersecting portion of the first part and the second part towards the inner portion of the frame body, and an outer surface of the raised portion includes a first region.

In some embodiments, an internal portion wall in the two side walls of the first wall facing the inner portion of the frame body is provided with a first notch region, an internal portion wall in the two side walls of the second wall facing the inner portion of the frame body is provided with a second notch region, and the first notch region and the second notch region are all used to avoid the raised portion.

In some embodiments, the first part includes a plurality of first reinforcement blocks, the first wall includes a plurality of first mold chambers, and each of said plurality of first reinforcement blocks is received in a corresponding one of the plurality of first mold chambers; and the second part includes a plurality of second reinforcement blocks, the second wall includes a plurality of second mold chambers, and each of said plurality of second reinforcement blocks is received in a corresponding one of the plurality of second mold chambers.

In some embodiments, a plurality of first reinforcement blocks are arranged along a third direction, a plurality of second reinforcement blocks are arranged along the third direction, and the third direction is a height direction of the first wall.

In some embodiments, the first connecting member is used to fix at least one of a plurality of first reinforcement blocks to the first wall; and the second connecting member is used to fix at least one of a plurality of second reinforcement blocks to the second wall.

In some embodiments, the raised portion protrudes from an intersecting portion of the at least one first reinforcement block and the at least one second reinforcement block towards the inner portion of the frame body.

In some embodiments, a plurality of first connecting members are disposed on at least one first reinforcement block; and a plurality of second connecting members is disposed on at least one second reinforcement block.

In some embodiments, the plurality of first connecting members are arranged along a second direction, a distance between a position of each of said plurality of first connecting members and a first end of the corresponding first reinforcement block accounts a length of one-sixth to one-half of the corresponding first reinforcement block in the second direction, and the first end is an end of the corresponding first reinforcement block away from the second wall; and a plurality of second connecting members are arranged along a first direction, a distance between a position of each of said plurality of second connecting members and a second end of the corresponding second reinforcement block accounts a length of one-sixth to one-half of the corresponding second reinforcement block in the first direction, and the second end is an end of the corresponding second reinforcement block away from the first wall.

In addition, an embodiment of the present application also provides an electrical apparatus including the battery pack described according to any one of the embodiments described above.

In addition, an embodiment of the present application further provides a method for producing a frame body of a battery, and the method includes providing a plurality of walls to form a receiving cavity of the frame body, said plurality of walls including a first wall and a second wall which are intersected, the first wall including a first mold chamber, the second wall including a second mold chamber therein, the first wall including a first outer top wall, the second wall including a second outer top wall, the first outer top wall being welded to the second outer top wall, and an end portion in a welding line between the first outer top wall and the second outer top wall close to an inner portion of the frame body being defined as a first line segment; and providing a reinforcement structure, the reinforcement structure including a first part and a second part which are connected, the first part being received in the first mold chamber and fixed to the first wall, and the second part being received in the second mold chamber and fixed to the second wall, wherein an outer surface of the reinforcement structure includes a first region, and an orthographic projection of the first line segment on a plane where the first region is located falls within the first region.

In addition, an embodiment of the present application further provides a device for producing a frame body of a battery, and the device includes a module for executing the above methods.

Although the present application has been described with reference to the preferred embodiments, various improvements can be made to it and the components therein can be replaced with equivalents without departing from the scope of the present application. In particular, as long as there is no structural conflict, various technical features mentioned in the various embodiments can be combined in any ways. The present application is not limited to the specific embodiments disclosed in the context, but includes all technical solutions falling within the scope of the claims.

What is claimed is:

1. A frame body for a battery pack, the frame body comprising
   a first bracket comprising a first mold chamber;
   a second bracket connected end to end with the first bracket to form a receiving cavity, the second bracket comprising a second mold chamber; and
   a block comprising a first reinforcement portion and a second reinforcement portion, wherein the first reinforcement portion is received in the first mold chamber, the second reinforcement portion is received in the second mold chamber, and the block is adapted to connect the first bracket with the second bracket,
   the first bracket comprises a first outer top wall, the second bracket comprises a second outer top wall, the first outer top wall is welded to the second outer top wall, and an end portion in a welding line between the first outer top wall and the second outer top wall close to an inner portion of the frame body is defined as a first line segment; and
   the first reinforcement portion is received in the first mold chamber of the first bracket and fixed to the first bracket, and the second reinforcement portion is received in the second mold chamber of the second bracket and fixed to the second bracket, and
   wherein an outer surface of the block comprises a first region, and an orthographic projection of the first line segment on a plane where the first region is located falls within the first region.

2. The frame body according to claim 1, wherein the first bracket comprises a first end close to the second bracket, and the first reinforcement portion is received in the first mold chamber at the first end; and
   the second bracket comprises a second end close to the first bracket, and the second reinforcement portion is received in the second mold chamber at the second end.

3. The frame body according to claim 1, wherein an intersecting line of the first outer top wall and the second outer top wall further comprises a second line segment, and the first line segment intersects non-collinearly with the second line segment.

4. The frame body according to claim 1, wherein the first bracket comprises two side walls arranged along a first direction, the first outer top wall is an outer wall for connecting the two side walls of the first bracket, the first bracket further comprises a first hollow cavity, and the first hollow cavity and the first mold chamber are arranged along the first direction; and
   the second bracket comprises two side walls arranged along a second direction, the second outer top wall is an outer wall for connecting the two side walls of the second bracket, the second bracket further comprises a second hollow cavity, and the second hollow cavity and the second mold chamber are arranged along the second direction.

5. The frame body according to claim 4, wherein the frame body further comprises
   a first connecting member for fixing the first reinforcement portion to the first bracket; and
   a second connecting member for fixing the second reinforcement portion to the second bracket.

6. The frame body according to claim 5, wherein the first connecting member comprises a head and a connecting portion, the first mold chamber and the first hollow cavity each is arranged in a column, the first mold chamber is disposed close to an outer side of the frame body, the first hollow cavity is disposed close to an internal portion of the frame body, and the first hollow cavity is adapted to receive the head of the first connecting member; and
   the second connecting member comprises a head and a connecting portion, the second mold chamber and the second hollow cavity each is arranged in a column, the second mold chamber is disposed close to the outer side of the frame body, the second hollow cavity is disposed close to the internal portion of the frame body, and the second hollow cavity is adapted to receive the head of the second connecting member.

7. The frame body according to claim 5, wherein the block comprises a raised portion protruding towards the inner portion of the frame body from an intersecting portion of the first reinforcement portion and the second reinforcement portion, and the outer surface of the raised portion comprises the first region.

8. The frame body according to claim 7, wherein a first internal portion wall of the two side walls of the first bracket facing the inner portion of the frame body is provided with a first notch region, a second internal portion wall of the two side walls of the second bracket facing the inner portion of the frame body is provided with a second notch region, and the first notch region and the second notch region are both adapted to avoid the raised portion.

9. The frame body according to claim 7, wherein the first reinforcement portion comprises a plurality of first reinforcement blocks, the first bracket comprises a plurality of first mold chambers, and each of said plurality of first reinforcement blocks is received in a corresponding one of said plurality of first mold chambers; and the second reinforcement portion comprises a plurality of second reinforcement blocks, the second bracket comprises a plurality of second mold chambers, and each of said plurality of second reinforcement blocks is received in a corresponding one of said plurality of second mold chambers.

10. The frame body according to claim 9, wherein the plurality of first reinforcement blocks are arranged along a third direction, the plurality of second reinforcement blocks are arranged along the third direction, and the third direction is a height direction of the first bracket.

11. The frame body according to claim 10, wherein the first connecting member is adapted to fix at least one first reinforcement block of a plurality of first reinforcement blocks to the first bracket; and the second connecting member is adapted to fix at least one second reinforcement block of a plurality of second reinforcement blocks to the second bracket.

12. The frame body according to claim 11, wherein the raised portion protrudes towards the inner portion of the frame body from an intersecting portion of the at least one first reinforcement block and the at least one second reinforcement block.

13. The frame body according to claim 11, wherein a plurality of first connecting members are disposed on the at least one first reinforcement block; and a plurality of second connecting members are disposed on the at least one second reinforcement block.

14. The frame body according to claim 9, wherein a plurality of first connecting members are arranged along the second direction, a distance between a position of each of the plurality of first connecting members and a first end of the corresponding first reinforcement block accounts a length of one-sixth to one-half of the corresponding first reinforcement block in the second direction, and the first end is an end of the corresponding first reinforcement block away from the second bracket; and the plurality of second connecting members are arranged along the first direction, a distance between a position of each of the plurality of second connecting members and a second end of the corresponding second reinforcement block accounts a length of one-sixth to one-half of the corresponding second reinforcement block in the first direction, and the second end is an end of the corresponding second reinforcement block away from the first bracket.

15. A battery pack, comprising
a plurality of battery cells;
an upper housing;
a bottom plate; and
the frame body according to claim 1, wherein the bottom plate and the frame body form a lower housing, and the lower housing is covered by the upper housing to form an enclosed space for receiving said plurality of battery cells.

16. A method for producing a frame body of a battery, the method comprising providing a plurality of first brackets and a plurality of second brackets to form a receiving cavity of the frame body, the first brackets each comprising a first mold chamber therein, the second brackets each comprising a second mold chamber therein, the first brackets each comprising a first outer top wall, the second brackets each comprising a second outer top wall, the first outer top wall being welded to the second outer top wall, and an end portion in a welding line between the first outer top wall and the second outer top wall close to an inner portion of the frame body being defined as a first line segment; and providing a blocks, the block comprising a first reinforcement portion and a second reinforcement portion which are connected, the first reinforcement portion being received in the first mold chamber of the first bracket and fixed to the first bracket, and the second reinforcement portion being received in the second mold chamber of the second bracket and fixed to the second bracket, wherein an outer surface of the block comprises a first region, and an orthographic projection of the first line segment on a plane where the first region is located falls within the first region.

17. A device comprising a battery pack used as a power source, the device comprising the battery pack according to claim 15, which is adapted to provide electric energy.

* * * * *